United States Patent
Zhang et al.

(10) Patent No.: US 12,477,523 B2
(45) Date of Patent: Nov. 18, 2025

(54) SIDELINK DATA PACKET SENDING AND RECEIVING METHOD AND COMMUNICATION APPARATUS

(71) Applicant: Huawei Technologies Co., Ltd., Shenzhen (CN)

(72) Inventors: Peng Zhang, Shanghai (CN); Rongkuan Liu, Shanghai (CN); Tianze Li, Shanghai (CN); Chixiang Ma, Shanghai (CN); Hua Xu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 386 days.

(21) Appl. No.: 17/743,689

(22) Filed: May 13, 2022

(65) Prior Publication Data

US 2022/0272678 A1    Aug. 25, 2022

Related U.S. Application Data

(63) Continuation of application No. PCT/CN2019/118990, filed on Nov. 15, 2019.

(51) Int. Cl.
*H04W 72/044* (2023.01)
*H04W 72/02* (2009.01)
(Continued)

(52) U.S. Cl.
CPC ......... *H04W 72/044* (2013.01); *H04W 72/53* (2023.01)

(58) Field of Classification Search
CPC .............................. H04W 72/044; H04W 72/53
(Continued)

(56) References Cited

U.S. PATENT DOCUMENTS

2018/0176892 A1 * 6/2018 Kim .................... H04W 52/04
2020/0275458 A1 * 8/2020 Khoryaev ............ H04W 72/25
(Continued)

FOREIGN PATENT DOCUMENTS

CN    110267311 A    9/2019
WO    WO-2016159845 A1 * 10/2016
(Continued)

OTHER PUBLICATIONS

ITRI, "Resource Allocation for NR Sidelink Mode 2", 3GPPTSG RAN WG1 #97 R1-1907232, May 13-17, 2019, 6 pages, Reno, USA.
(Continued)

*Primary Examiner* — Xuan Lu
(74) *Attorney, Agent, or Firm* — SLATER MATSIL, LLP

(57) ABSTRACT

A method including determining, by a first terminal device, a size of a sidelink data packet, determining, by the first terminal device based on the size of the sidelink data packet, a first quantity of time-frequency units corresponding to the sidelink data packet, determining, by the first terminal device, a frequency domain resource of a second time-frequency resource from a first time-frequency resource, based on the first quantity, a resource selection rule, and at least one of a time domain resource of the second time-frequency resource, or a frequency domain resource of the second time-frequency resource, and performing, by the first terminal device, at least one of sending the sidelink data packet to a second terminal device on the second time-frequency resource, or receiving the sidelink data packet from a second terminal device on the second time-frequency resource.

19 Claims, 9 Drawing Sheets

(51) Int. Cl.
*H04W 72/52* (2023.01)
*H04W 72/53* (2023.01)
*H04W 92/18* (2009.01)

(58) Field of Classification Search
USPC .......................................................... 370/330
See application file for complete search history.

(56) References Cited

U.S. PATENT DOCUMENTS

| | | | |
|---|---|---|---|
| 2021/0099901 A1* | 4/2021 | Huang | H04W 72/12 |
| 2021/0211232 A1* | 7/2021 | Hwang | H04W 72/0446 |
| 2022/0201711 A1* | 6/2022 | Lee | H04W 72/20 |
| 2022/0369291 A1* | 11/2022 | Shibaike | H04L 1/1887 |

FOREIGN PATENT DOCUMENTS

| | | | | |
|---|---|---|---|---|
| WO | 2017135998 A1 | 8/2017 | | |
| WO | WO-2018055813 A1 * | 3/2018 | ......... | H04L 43/0876 |
| WO | 2019073464 A1 | 4/2019 | | |
| WO | WO-2021021015 A1 * | 2/2021 | ............. | H04L 67/12 |

OTHER PUBLICATIONS

Nokia et al., "Discussion of Resource Allocation for Sidelink—Mode 1", 3GPP TSG RAN WG1 Meeting #98bis R1-1910513, Oct. 14-20, 2019, 5 pages, Chongqing, China.

* cited by examiner

SIDELINK DATA PACKET SENDING AND RECEIVING METHOD AND COMMUNICATION APPARATUS

CROSS-REFERENCE TO RELATED APPLICATIONS

This application is a continuation of International Application No. PCT/CN2019/118990, filed on Nov. 15, 2019, the disclosure of which is hereby incorporated by reference in its entirety.

TECHNICAL FIELD

This application relates to the wireless communication field, and in particular, to a sidelink data packet sending and receiving method, and a communication apparatus.

BACKGROUND

Wireless communication technologies have experienced rapid development in the past decades, and have successively experienced a first generation wireless communication system based on an analog communication system, a second generation (2G) wireless communication system represented by a global system for mobile communications (GSM), a third generation (3G) wireless communication system represented by wideband code division multiple access (WCDMA), a long term evolution (LTE) fourth generation (4G) wireless communication system that has been widely put into commercial use in the world and has achieved great success, and an increasingly mature fifth generation (5G) wireless communication system (also referred to as a new radio (NR) communication system). Services supported by the wireless communication system are also developed from an initial voice service and short message service to currently supported wireless high-speed data communication. At the same time, a quantity of wireless connections around the world is continuously surging, and various new wireless service types proliferate. As various new services emerge one after another, different services require different resources, and this makes a requirement on resource utilization of a wireless communication network increasingly strict.

A main feature to be supported in the NR communication system is UE cooperation transmission. To be specific, when completing target data transmission with a network device through an uplink or a downlink, a terminal device (for ease of differentiation, described as a first terminal device in the following) may further implement data transmission enhancement based on forwarding of the target data by another terminal device (for ease of differentiation, described as a second terminal device in the following). For example, FIG. 1 is a schematic diagram of a structure of a communication system according to an embodiment of this application. The communication system supports a UE cooperation function. Specifically, the network device may send the target data to the first terminal device and the second terminal device at the same time, and after receiving the target data, the first terminal device may send the target data to the second terminal device through a sidelink established between the first terminal device and the second terminal device. In this way, the second terminal device can perform joint processing on the target data received by the second terminal device from the network device and the target data received from the first terminal device, so that receiving performance of the second terminal device is improved. In a process in which the first terminal device sends the target data to the second terminal device through the sidelink, the first terminal device and the second terminal device need to have consistent understanding of scheduling information of the target data, to ensure that the second terminal device can correctly receive the target data. Herein, the scheduling information mainly includes information such as a time-frequency resource occupied when the first terminal device sends the target data, and used modulation and demodulation. In this way, sidelink control signaling needs to be frequently exchanged between the first terminal device and the second terminal device. Consequently, this causes large sidelink resource overheads, and reduces resource utilization of the communication system.

SUMMARY

This application provides a sidelink data packet sending and receiving method, and a communication apparatus, to reduce a waste of sidelink resources, and improve resource utilization and applicability of a communication system.

According to a first aspect, an embodiment of this application provides a sidelink data packet sending and receiving method. The method includes a first terminal device determines a size of a sidelink data packet. The first terminal device determines, based on the size of the sidelink data packet, a first quantity of time-frequency units corresponding to the sidelink data packet. The first terminal device determines a frequency domain resource of a second time-frequency resource from a first time-frequency resource based on the first quantity, a time domain resource of the second time-frequency resource, and a resource selection rule, or the first terminal device determines a time domain resource of a second time-frequency resource from a first time-frequency resource based on the first quantity, a second frequency domain resource of the second time-frequency resource, and a resource selection rule. The first terminal device sends the sidelink data packet to a second terminal device or receives the sidelink data packet from a second terminal device on the second time-frequency resource.

In this embodiment, in a process in which the first terminal device sends the sidelink data packet to the second terminal device or receives the sidelink data packet from the second terminal device, the first terminal device may determine, based on the size of the sidelink data packet and scheduling information such as the first time-frequency resource and the resource selection rule, the second time-frequency resource occupied by the sidelink data packet. This avoids a waste of sidelink control resources caused by the first terminal device and the second terminal device to ensure consistent understanding of the second time-frequency resource (that is, frequently exchange sidelink control signaling to unify the second time-frequency resource), and improves utilization of communication resources and applicability of a communication system.

With reference to the first aspect, in a possible implementation, the time domain resource of the second time-frequency resource or the second frequency domain resource of the second time-frequency resource is predefined, or the time domain resource of the second time-frequency resource or the second frequency domain resource of the second time-frequency resource is configured by using a network device.

With reference to the first aspect, in a possible implementation, the resource selection rule is predefined or configured by the network device, and the resource selection rule includes selecting at least one second time domain unit from second time domain units based on a sequence number of each second time domain unit included in the first time-frequency resource, where the sequence numbers of the second time domain units are used to indicate a sequence of the second time domain units in time domain, and/or selecting at least one first frequency domain unit based on a sequence number of each first frequency domain unit included in the first time-frequency resource, where the sequence numbers of the first frequency domain units are used to indicate a sequence of the first frequency domain units in frequency domain. The second time domain unit or the first frequency domain unit is selected from the first time-frequency resource based on the sequence number. This is simple and easy to implement. In addition, in a process in which the first terminal device sends the sidelink data packet to the second terminal device or receives the sidelink data packet from the second terminal device, that the first terminal device and the second terminal device use a unified and specific resource selection rule can ensure consistency of second time-frequency resources determined by the first terminal device and the second terminal device.

With reference to the first aspect, in a possible implementation, the first terminal device determines a second quantity of first time domain units included in the time domain resource of the second time-frequency resource. The first terminal device determines, based on the second quantity and the first quantity, a third quantity of first frequency domain units included in the frequency domain resource of the second time-frequency resource. The first terminal device determines the frequency domain resource from the first time-frequency resource based on the third quantity and a resource allocation rule. Herein, the first terminal device calculates, based on the size of the sidelink data packet, the scheduling information used for performing sidelink communication with the second terminal device, the second time-frequency resource required for sending the sidelink data packet. A waste of downlink control resources and an inflexible time-frequency resource configuration that are caused by configuring the second time-frequency resource by the network device for the sidelink data packet can be avoided, and the resource utilization and applicability of the communication system can be improved. In addition, the second terminal device may alternatively actively calculate, based on the size of the sidelink data packet, the scheduling information used for performing sidelink communication with the first terminal device, and the like, the second time-frequency resource required for receiving the sidelink data packet. Therefore, a waste of sidelink control resources caused by frequent sending of the second time-frequency resource by the first terminal device to the second terminal device can be avoided, and the resource utilization of the communication system can be improved.

With reference to the first aspect, in a possible implementation, the first time domain unit includes N1 second time domain units, the first frequency domain unit includes N2 second frequency domain units, and the third quantity, the second quantity, and the first quantity meet the following relational expression:

$$R2 = \frac{T1}{R1 \times N1 \times N2}$$

R2 is the third quantity of first frequency domain units included in the frequency domain resource of the second time-frequency resource, R1 is the second quantity, T1, R1, N1, R2, and N2 are positive integers greater than 0, a preset condition is met between T1 and the first quantity, and T1 is a quantity of time-frequency units included in the second time-frequency resource. Herein, because an association relationship between the quantity of first frequency domain units included in the second time-frequency resource, the quantity of second time domain units, and the quantity of time-frequency units included in the second time-frequency resource is clear and reliable, according to the foregoing formula, it can also be ensured that the calculated third quantity is true and reliable. This ensures accuracy of the subsequently determined second time-frequency resource.

With reference to the first aspect, in a possible implementation, the preset condition includes T1 is a largest positive integer among all positive integers less than or equal to the first quantity, or T1 is a smallest positive integer among all positive integers greater than the first quantity. Herein, the quantity of time-frequency units included in the second time-frequency resource is quantized based on the preset condition, so that the determined second time-frequency resource matches a minimum time-frequency unit used when the sidelink data packet is actually transmitted. This ensures reliability of subsequent sidelink data packet transmission.

With reference to the first aspect, in a possible implementation, the first terminal device determines a fourth quantity of first frequency domain units included in the second frequency domain resource of the second time-frequency resource. The first terminal device determines, based on the fourth quantity and the first quantity, a fifth quantity of second time domain units included in the time domain resource of the second time-frequency resource. The first terminal device determines the time domain resource from the first time-frequency resource based on the fifth quantity and a resource allocation rule.

With reference to the first aspect, in a possible implementation, the first time domain unit includes a plurality of second time domain units, the first frequency domain unit includes N2 second frequency domain units, and the fourth quantity, the fifth quantity, and the first quantity meet the following relational expression:

$$R4 = \frac{T2}{R3 \times N2}$$

R4 is the fifth quantity of second time domain units included in the time domain resource of the second time-frequency resource, R3 is the fourth quantity, T2, R3, R4, and N2 are positive integers greater than 0, a preset condition is met between T2 and the first quantity, and T2 is a quantity of time-frequency units included in the second time-frequency resource. Herein, because an association relationship between the quantity of second time domain units in the second time-frequency resource, the quantity of first frequency domain units, and the quantity of time-frequency units included in the second time-frequency resource is clear and reliable, according to the foregoing formula, it can also be ensured that the calculated fifth quantity is true and reliable. This ensures the accuracy of the subsequently determined second time-frequency resource.

With reference to the first aspect, in a possible implementation, the preset condition includes T2 is a largest positive integer among all positive integers less than or equal to the first quantity, or T2 is a smallest positive integer among all positive integers greater than the first quantity. Herein, the quantity of time-frequency units included in the second time-frequency resource is quantized based on the preset condition, so that the determined second time-frequency resource matches a minimum time-frequency unit used when the sidelink data packet is actually transmitted. This ensures reliability of subsequent sidelink data packet transmission.

According to a second aspect, an embodiment of this application provides a sidelink data packet sending and receiving method. A network device determines scheduling information, where the scheduling information includes data volume information of a sidelink data packet, a first time-frequency resource, a resource selection rule, and a time domain resource or a frequency domain resource of a second time-frequency resource. The data volume information is used by a first terminal device and a second terminal device to determine a size of the sidelink data packet. The network device sends the scheduling information to the first terminal device and/or the second terminal device. Herein, the size of the sidelink data packet, the first time-frequency resource, the resource selection rule, and the time domain resource or the frequency domain resource of the second time-frequency resource are used by the first terminal device to determine the second time-frequency resource for sending the sidelink data packet to the second terminal device or receiving the sidelink data packet from the second terminal device.

With reference to the second aspect, in a possible implementation, the scheduling information is carried in physical layer signaling or radio resource control (RRC) signaling.

According to a third aspect, an embodiment of this application provides a sidelink data packet sending and receiving method. A first terminal device determines a size of a sidelink data packet. The first terminal device determines second coding and modulation information based on the size of the sidelink data packet and a third time-frequency resource. The first terminal device sends the sidelink data packet to the second terminal device or receives the sidelink data packet from the second terminal device on the third time-frequency resource based on the second coding and modulation information.

In this embodiment of this application, the first terminal device may select applicable coding and modulation information from a preset coding and modulation information set based on the size of the sidelink data packet and the third time-frequency resource that is preconfigured or predefined by a network device. Therefore, when a time-frequency resource is fixed, effective transmission of the sidelink data packet is ensured, and practicability and applicability of a communication system are improved.

With reference to the third aspect, in a possible implementation, the first terminal device determines first spectral efficiency based on the size of the sidelink data packet and the preset third time-frequency resource. The first terminal device determines the second coding and modulation information from the preset coding and modulation information set based on the first spectral efficiency and a modulation and coding scheme matching rule.

With reference to the third aspect, in a possible implementation, the coding and modulation information set includes N3 types of coding and modulation information including the second coding and modulation information. The modulation and coding information matching rule includes spectral efficiency corresponding to the second coding and modulation information is less than the first spectral efficiency, and a difference between the spectral efficiency and the first spectral efficiency is the smallest, or spectral efficiency corresponding to the second coding and modulation information is greater than or equal to the first spectral efficiency, and a difference between the spectral efficiency and the first spectral efficiency is the smallest. According to the modulation and coding information matching rule, coding and modulation information that better matches the first spectral efficiency may be selected from the coding and modulation information set, so that the determined second coding and modulation information is more reasonable and applicable.

With reference to the third aspect, in a possible implementation, the first terminal device determines a quantity of time-frequency units included in the preset third time-frequency resource. The first terminal device determines the first spectral efficiency based on the quantity of time-frequency units and the size of the sidelink data packet.

According to a fourth aspect, an embodiment of this application provides a communication apparatus. The communication apparatus may be a first terminal device, or may be a chip used in the first terminal device, or another combined device, another component, or the like that can implement a function of the first terminal device. The communication apparatus includes units configured to perform the sidelink data packet sending and receiving method provided in any one of the possible implementations of the first aspect or the third aspect. Therefore, beneficial effects (or advantages) of the sidelink data packet sending and receiving method provided in the first aspect or the third aspect can also be implemented.

According to a fifth aspect, an embodiment of this application provides a communication apparatus. The communication apparatus may be a network device, or may be a chip used in the network device, or another combined device, another component, or the like that can implement a function of the network device. The communication apparatus includes units configured to perform the sidelink data packet sending and receiving method provided in any one of the possible implementations of the second aspect. Therefore, beneficial effects (or advantages) of the sidelink data packet sending and receiving method provided in the second aspect can also be implemented.

According to a sixth aspect, an embodiment of this application provides a communication apparatus. The communication apparatus may be a first terminal device, or may be a chip used in the first terminal device, or another combined device, another component, or the like that can implement a function of the first terminal device. The communication apparatus includes at least one memory and at least one processor. The at least one processor is configured to invoke code stored in a memory to perform the sidelink data packet sending and receiving method provided in any one of the implementations of the first aspect or the third aspect.

According to a seventh aspect, an embodiment of this application provides a communication apparatus. The communication apparatus may be a network device, or may be a chip used in the network device, or another combined device, another component, or the like that can implement a function of the network device. The communication apparatus includes at least one memory and at least one processor. The at least one processor is configured to invoke code stored in a memory to perform the sidelink data packet sending and receiving method provided in any one of the implementations of the second aspect.

According to an eighth aspect, an embodiment of this application provides a communication apparatus. The communication apparatus may be, for example, a chip system. The communication apparatus includes at least one processor and an interface circuit. The interface circuit is configured to read and transmit code instructions to the at least one processor, and output instructions of the at least one processor. The processor is configured to run the code instructions, to implement the sidelink data packet sending and receiving method provided in any one of the implementations of the first aspect or the third aspect, and to implement beneficial effects (or advantages) of the communication method provided in the first aspect or the third aspect.

According to a ninth aspect, an embodiment of this application provides a communication apparatus. The communication apparatus may be a chip system. The communication apparatus includes at least one processor and an interface circuit. The interface circuit is configured to read and transmit code instructions to the at least one processor, and output instructions of the at least one processor. The processor is configured to run the code instructions, to implement the sidelink data packet sending and receiving method provided in any one of the implementations of the second aspect, and to implement beneficial effects (or advantages) of the communication method provided in the second aspect.

The chip system in the foregoing aspects may be a system-on-a-chip (system-on-a-chip, SoC), or may be a baseband chip, or the like. The baseband chip may include a processor, a channel encoder, a digital signal processor, a modem, an interface module, or the like.

According to a tenth aspect, an embodiment of this application provides a computer-readable storage medium. The computer-readable storage medium stores instructions. When the instructions are run on a computer, the sidelink data packet sending and receiving method provided in any one of the implementations of the first aspect or the third aspect is implemented, and beneficial effects (or advantages) of the sidelink data packet sending and receiving method provided in the first aspect or the third aspect can also be implemented.

According to an eleventh aspect, an embodiment of this application provides a computer-readable storage medium. The computer-readable storage medium stores instructions. When the instructions are run on a computer, the sidelink data packet sending and receiving method provided in any one of the implementations of the second aspect is implemented, and beneficial effects (or advantages) of the sidelink data packet sending and receiving method provided in the second aspect can also be implemented.

According to a twelfth aspect, an embodiment of this application provides a computer program product including instructions. When the computer program product runs on a computer, the computer is enabled to perform the sidelink data packet sending and receiving method provided in the first aspect or the third aspect. Beneficial effects of the sidelink data packet sending and receiving method provided in the first aspect or the third aspect can also be implemented.

According to a thirteenth aspect, an embodiment of this application provides a computer program product including instructions. When the computer program product runs on a computer, the computer is enabled to perform the communication method provided in the second aspect. Beneficial effects of the communication method provided in the second aspect can also be implemented.

According to a fourteenth aspect, an embodiment of this application provides a communication system. The communication system includes the communication apparatuses described in the fourth aspect and the fifth aspect, the communication apparatuses described in the sixth aspect and the seventh aspect, or the communication apparatuses described in the eighth aspect and the ninth aspect.

According to a fifteenth aspect, an embodiment of this application provides a communication system. The communication system includes the first terminal device and the second terminal device that are related to or described in the first aspect, the second aspect, the third aspect, the fourth aspect, or the sixth aspect.

According to embodiments of this application, a waste of sidelink resources caused by using the sidelink resources to transmit information such as a time-frequency resource or coding and modulation information can be reduced, and resource utilization and applicability of a communication system can be improved.

DETAILED DESCRIPTION OF ILLUSTRATIVE EMBODIMENTS

The following describes technical solutions of this application with reference to accompanying drawings.

Embodiments of this application provide a sidelink data packet sending and receiving method, which is applicable to various wireless communication systems that support a UE cooperation function and can transmit data through a sidelink, such as a global system for mobile communications (GSM) that supports the UE cooperation function and can transmit data through the sidelink, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system (also referred to as a new radio (NR) system), or a future communication system.

A first terminal device or a second terminal device in embodiments of this application may be user equipment, an access terminal, a subscriber unit, a subscriber station, a mobile station, a mobile console, a remote station, a remote terminal, a mobile device, a user terminal, a terminal, a wireless communication apparatus, a user agent, or a user apparatus, or may be a car, a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a roadside unit, a wearable device, a terminal device in a future 5G network, a terminal device in a future evolved public land mobile communication network (PLMN), or the like. This is not limited in embodiments of this application. For ease of understanding, in embodiments of this application, the first terminal device or the second terminal device is used for unified description.

A network device in embodiments of this application may be a device configured to communicate with a terminal device. The network device may be a base transceiver station (BTS) in a global system for mobile communications (GSM) or code division multiple access (CDMA) system, may be a base station (NodeB, NB) in a wideband code division multiple access (WCDMA) system, may be an evolved base station (evolved NodeB, eNB or eNodeB) in an LTE system, or may be a wireless controller in a cloud radio access network (CRAN) scenario. Alternatively, the network device may be a relay station, an access point, a vehicle-mounted device, a wearable device, a network device in a 5G network, a network device in a future evolved PLMN network, or the like. This is not limited in embodiments of this application.

Figure 1:
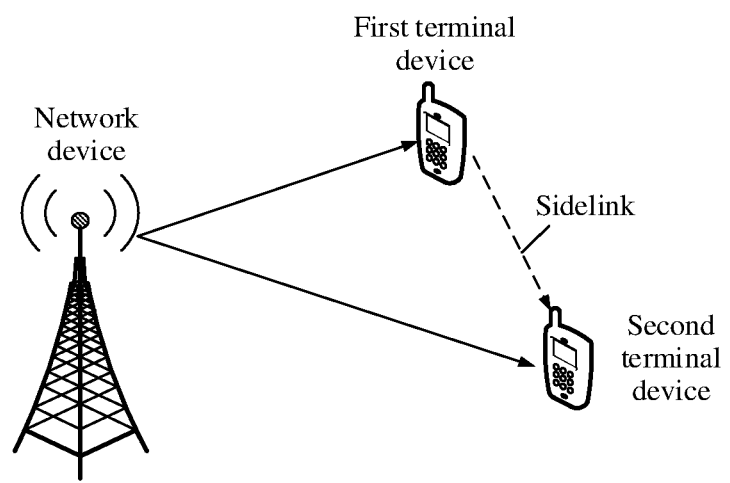
FIG. 1 is a schematic diagram of a structure of a communication system according to an embodiment of this application.

Refer to FIG. 1. FIG. 1 is a schematic diagram of a structure of a communication system according to an embodiment of this application. It can be learned from FIG. 1 that the communication system includes a network device, a first terminal device, and a second terminal device. A sidelink is a new wireless link defined for direct communication between two terminal devices in a wireless network. As shown in FIG. 1, information or data can be directly transmitted between two terminal devices through a sidelink, without forwarding by a relay device, for example, a base station. Herein, it should be further noted that, in a sidelink in embodiments of this application, a physical sidelink shared channel (PSSCH), a physical sidelink control channel (PSCCH), and the like are defined. In a process in which the first terminal device forwards, to the second terminal device, data sent by the network device, to improve receiving performance of the second terminal device, the first terminal device needs to notify the second terminal device, before forwarding the data, of scheduling information used by the first terminal device for forwarding the data (that is, the first terminal device and the second terminal device are enabled to have consistent understanding of the scheduling information of the data), so that the second terminal device correctly receives the data forwarded by the first terminal device. Herein, the scheduling information is a main parameter used to support the first terminal device or the second terminal device in transmitting data. The scheduling information may mainly include information such as a time-frequency resource, a modulation scheme, and a coding scheme. However, in actual application, each time before sending a sidelink data packet to the second terminal device, the first terminal device needs to send, to the second terminal device by using sidelink control signaling, scheduling information corresponding to the sidelink data packet. In this way, a large quantity of overheads of sidelink resources are caused, and resource utilization of the communication system is reduced.

Therefore, a main technical problem to be resolved in embodiments of this application is how to reduce signaling overheads caused by transmitting scheduling information by using sidelink control signaling, and improve utilization of communication resources.

For ease of understanding and description of embodiments of this application, the following first briefly describes related concepts in embodiments of this application.

1. Time-Frequency Unit, Time Domain Unit, and Frequency Domain Unit

In actual application, a time-frequency resource is divided into a plurality of time-frequency units according to a preset resource division rule. A terminal device or a network device may schedule the time-frequency resource by using a unit of time-frequency unit. A time domain resource included in the time-frequency resource is also divided into a plurality of time domain units based on the preset division rule, and a frequency domain resource included in the time-frequency resource is also divided into a plurality of frequency domain units based on the preset division rule. The terminal device or the network device may schedule the time domain resource based on a unit of time domain unit, or may schedule the frequency domain resource based on a unit of frequency domain unit. Certainly, one time-frequency unit may be divided into a plurality of time-frequency resource units based on different scheduling requirements. Similarly, this also applies to the time domain unit and the frequency domain unit. In embodiments of this application, one specific time domain resource may include a plurality of first time domain units, and each first time domain unit may further include a plurality of second time domain units. In specific implementation, the first time domain unit may be a slot, and the second time domain unit may be a symbol. In other words, a specific time domain resource may include a plurality of slots, and each slot may include a plurality of symbols. One specific frequency domain resource may include a plurality of first frequency domain units, and each first frequency domain unit may further include a plurality of second frequency domain units. In specific implementation, the first frequency domain unit may be a resource block (RB) (including 12 consecutive subcarriers), and the second frequency domain unit may be a subcarrier. In addition, one specific time-frequency resource may include a plurality of resource elements (REs). One RE corresponds to one symbol in time domain, and corresponds to one subcarrier in frequency domain. For ease of understanding, in embodiments of this application, the first time domain unit, the second time domain unit, the first frequency domain unit, the second frequency domain unit, and the time-frequency unit are specifically described by using a slot, a symbol, a resource block, a subcarrier, and a resource unit as an example.

2. Coding and Modulation Information

In actual application, a network device and a terminal device share one or more types of coding and modulation information, and the foregoing coding and modulation information is mainly used by the network device or the terminal device to perform channel coding and modulation operations before sending data. Each type of coding and modulation information may mainly include content such as a code rate, modulation scheme information, spectral efficiency, and the like. The code rate is used to indicate a ratio of a quantity of bits included in to-be-transmitted data to a quantity of bits included in data obtained after channel coding. A common channel coding manner may include reverse non-return-to-zero coding, Manchester coding, unipolar return-to-zero coding, differential binary phase coding, and the like. This is not specifically limited in embodiments of this application. For example, if the code rate included in the coding and modulation information is 120/1024, the network device or the terminal device may encode 120-bit data into 1024-bit data. The modulation scheme information indicates a signal modulation scheme used by the network device or the terminal device to perform signal modulation on the channel-coded data. In actual application, the signal modulation scheme may include single sideband (SSB) modulation, double sideband (DSB) modulation, differential phase shift keying (DPSK), quadrature phase shift keying (QPSK), and the like. This is not specifically limited in embodiments of this application. The spectral efficiency is a ratio of a quantity of bits of to-be-transmitted data to a quantity of modulation symbols that are finally obtained through modulation. For example, if the to-be-transmitted data includes 120 bits, the code rate is 120/1024, and the modulation scheme is quadrature phase shift keying (that is, two encoded bits are mapped to one modulation symbol), 1024 bits may be obtained after channel coding is performed on the 120 bits, and then 512 modulation symbols may be obtained after signal modulation is performed on the 1024 bits. In this case, the spectral efficiency is 120/512, which is about 0.234. For an LTE network or an NR network, each modulation symbol occupies one RE. Therefore, a unit of the spectral efficiency is bit/RE or bit/(symbol*subcarrier). It may be understood that one or more types of coding and modulation information may be configured for the network device or the terminal device, and the network device or the terminal device may select and use one of the one or more types of coding and modulation information based on an actual situation. In actual application, a plurality of types of coding and modulation information are preconfigured in the network device, and then the network device sends a modulation and coding scheme (MCS) indication table to the terminal device, to configure a plurality of coding and modulation schemes for the terminal device. For example, refer to Table 1-1. Table 1-1 is a modulation and coding scheme indication table according to an embodiment of this application. As shown in Table 1-1, an MCS sequence number herein may also be referred to as an MCS index, and one MCS sequence number corresponds to one type of coding and modulation information. It can be learned from Table 1-1 that coding and modulation information that can be used by the network device or the terminal device includes at least three types of coding and modulation information: coding and modulation information whose MCS sequence number is 0 (for ease of description, subsequently described as coding and modulation information 0), coding and modulation information whose MCS sequence number is 1 (for ease of description, subsequently described as coding and modulation information 1), and coding and modulation information whose MCS sequence number is 2 (for ease of description, subsequently described as coding and modulation information 2). The coding and modulation information 0 indicates that the modulation scheme is QPSK, the code rate is 120/1024, and the spectral efficiency is 0.2344. The coding and modulation information 1 indicates that the modulation scheme is QPSK, the code rate is 157/1024, and the spectral efficiency is 0.3066. The coding and modulation information 2 indicates that the modulation scheme is DPSK, the code rate is 193/1024, and the spectral efficiency is 0.3770. Optionally, when configuring modulation and coding information for the terminal device by using a modulation and coding scheme indication table, the network device may also send a fixed MCS sequence number, to indicate coding and modulation information fixedly used by the terminal device. Alternatively, the network device may not indicate corresponding coding and modulation information to the terminal device, but the terminal device autonomously selects appropriate coding and modulation information based on a service status and a load status of the terminal device. This is not specifically limited in this application.

TABLE 1-1

| MCS sequence number | Modulation scheme information | Code rate | Spectral efficiency |
|---|---|---|---|
| 0 | QPSK | 120/1024 | 0.2344 |
| 1 | QPSK | 157/1024 | 0.3066 |
| 2 | DPSK | 193/1024 | 0.3770 |
| ... | ... | ... | ... |

Figure 2:
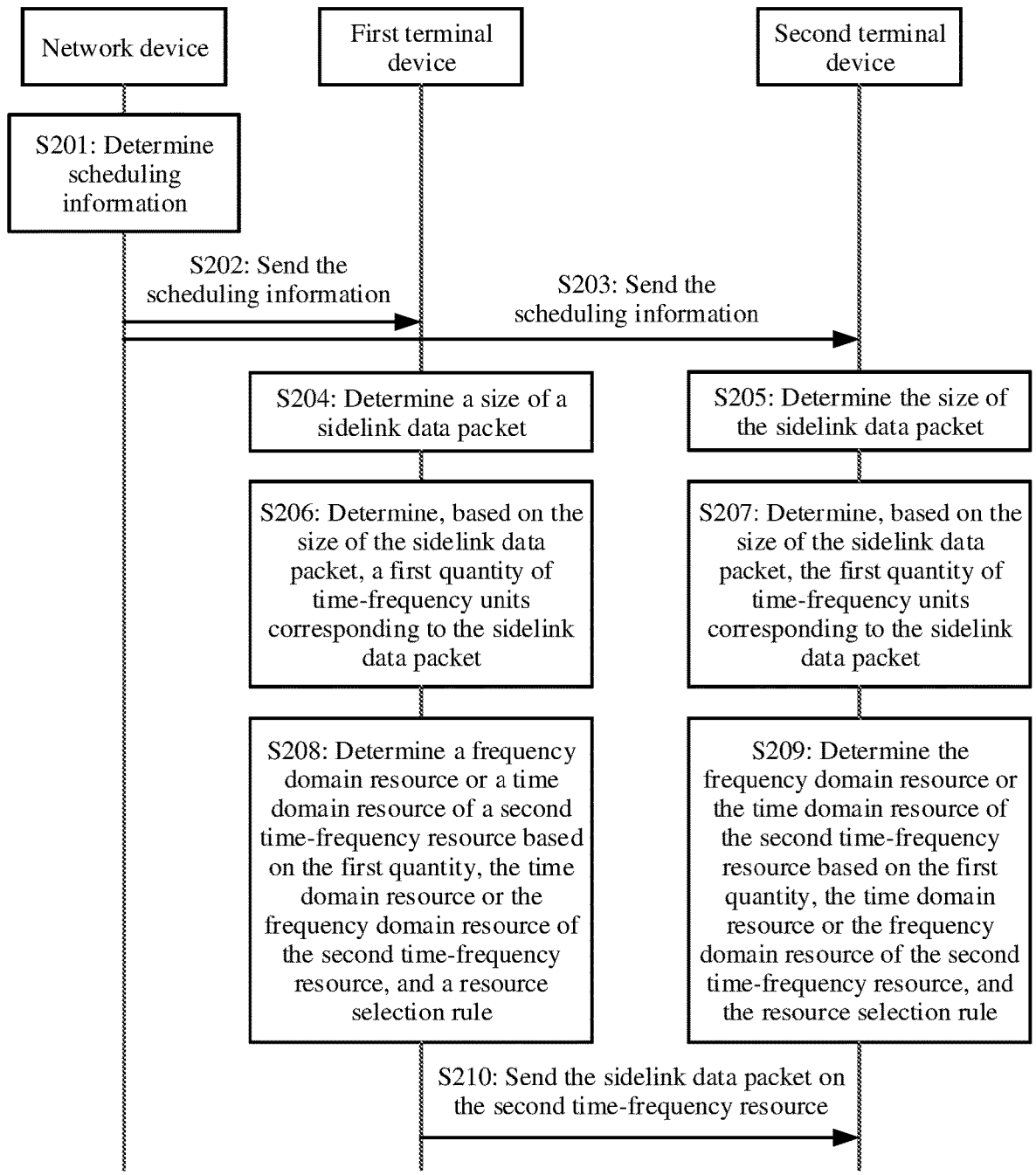
FIG. 2 is a schematic flowchart of a sidelink data packet sending and receiving method according to an embodiment of this application.

FIG. 2 is a schematic flowchart of a sidelink data packet sending and receiving method according to an embodiment of this application. The sidelink data packet sending and receiving method is applicable to the communication system shown in FIG. 1. Because processes of determining a time-frequency resource occupied by a sidelink data that are in a process in which a first terminal device sends a sidelink data packet to a second terminal device and a process in which the first terminal device receives the sidelink data packet from the second terminal device are the same, in some embodiments, a scenario in which the first terminal device sends the sidelink data packet to the second terminal device (that is, the first terminal device is a transmit end, and the second terminal device is a receive end) is used as an example, to specifically describe a process in which the first terminal device determines the time-frequency resource for sending the sidelink data packet and a process in which the second terminal device determines the time-frequency resource for receiving the sidelink data packet. It can be learned from FIG. 2 that the method includes the following steps.

S201: A network device determines scheduling information.

In some possible implementations, before a first terminal device sends a sidelink data packet to a second terminal device, the network device may first determine scheduling information required by the first terminal device to send the sidelink data packet (for ease of differentiation, described as first scheduling information in the following) and scheduling information used by the second terminal device to receive the sidelink data packet (for ease of differentiation, described as second scheduling information in the following), and respectively send the first scheduling information and the second scheduling information to the first terminal device and the second terminal device. The first scheduling information or the second scheduling information may mainly include data volume information of the sidelink data packet and a time-frequency resource available for sidelink data transmission (for ease of understanding and differentiation, described as a first time-frequency resource in the following). Optionally, the first scheduling information or the second scheduling information may alternatively include a resource selection rule, modulation and coding information used for transmitting the sidelink data packet, and a time domain resource or a frequency domain resource in a time-frequency resource that is actually to be occupied when the sidelink data packet is transmitted (for ease of understanding and differentiation, described as a second time-frequency resource in the following). Herein, the data volume information is used to indicate a size of the sidelink data packet. The resource selection rule is used by the first terminal device or the second terminal device to select a specific time domain unit or a specific frequency domain unit from the first time-frequency resource. In specific implementation, optionally, the resource selection rule may be selecting at least one symbol from symbols based on a sequence number of each symbol included in the first time-frequency resource. Herein, the sequence numbers of the symbols are used to indicate a sequence of the symbols in time domain. Alternatively, the resource selection rule may be selecting at least one resource block based on a sequence number of each resource block included in the first time-frequency resource. The sequence number of each resource block is used to indicate a high-low order of each resource block in frequency domain. It should be noted that, because processes of determining the second time-frequency resource before the first terminal device and the second terminal device transmit the sidelink data packet each time are the same, the following uses processes of determining the second time-frequency resource before the first terminal device and the second terminal device transmit a target sidelink data packet as an example for description.

In specific implementation, for the first terminal device, the network device may first determine the data volume information corresponding to the data packet (for ease of differentiation, described as a downlink data packet in the following) to be sent by the network device to the first terminal device and the second terminal device. Herein, in a UE cooperation scenario, the downlink data packet is a sidelink data packet subsequently sent by the first terminal device to the second terminal device through a sidelink. For example, the network device may count a quantity of bits occupied by the downlink sidelink data packet, and determine the quantity of bits as first data volume information corresponding to the first terminal device. For another example, the network device may alternatively obtain a downlink time-frequency resource (for ease of differentiation, described as a first downlink time-frequency resource in the following) occupied when the network device sends the downlink data packet to the first terminal device and modulation and coding information (for ease of differentiation, described as first downlink coding and modulation information in the following) and determine the first downlink time-frequency resource and the first modulation and coding information as data volume information (for ease of differentiation, described as the first data volume information in the following) corresponding to the first terminal device. In addition, the network device may further determine, based on information such as a load status of a current network and a service status of the first terminal device, the first time-frequency resource used by the first terminal device to perform sidelink communication and the time domain resource or the frequency domain resource (for ease of understanding and differentiation, described as a first time domain resource and a second frequency domain resource in the following) of the second time-frequency resource when the first terminal device sends the sidelink data packet to the second terminal device. The network device may further determine, based on resource allocation information preconfigured by the network device, the resource selection rule followed when the first terminal device selects a time domain unit or a frequency domain unit from the first time-frequency resource. Herein, when the first time domain resource is preconfigured, the resource selection rule may be used by the first terminal device to select, from a frequency domain resource included in the first time-frequency resource, one or more frequency domain units (that is, resource blocks) actually to be occupied by the first terminal device. Alternatively, when the second frequency domain resource is predefined, the resource selection rule may be used by the first terminal device to select, from a time domain resource included in the first time-frequency resource, one or more symbols actually to be occupied by the first terminal device. The network device may further determine, based on channel state information, resource usage status information, and the like of a sidelink between the first terminal device and the second terminal device, modulation and coding information (for ease of differentiation, described as the first modulation and coding information in the following) used when the first terminal device sends the sidelink data packet to the second terminal device. Finally, the network device may determine the first data volume information, the first time-frequency resource, the resource selection rule, the time domain resource or the frequency domain resource of the second time-frequency resource, and the first coding and modulation information as the first scheduling information corresponding to the first terminal device. Likewise, the network device may also determine, in a same manner, the second scheduling information corresponding to the second terminal device. Details are not described herein again.

Optionally, because the first time-frequency resource, the resource selection rule, the first coding and modulation information, and the time domain resource or frequency domain resource in the preconfigured second time-frequency resource that are included in the first scheduling information corresponding to the first terminal device are the same as those included in the second scheduling information corresponding to the second terminal device, a size of a data packet indicated by the first data volume information is also the same as that indicated by the second data volume information. Therefore, on a premise that communication resource utilization is considered, after obtaining the first scheduling information and the second scheduling information, the network device may combine the first scheduling information and the second scheduling information into one piece of third scheduling information. Herein, the third scheduling information may include the first time-frequency resource, the resource selection rule, the time domain resource or the frequency domain resource in the preconfigured second time-frequency resource, the first data volume information, the second data volume information, and the first coding and modulation information. Particularly, when both the first data volume information and the second data volume information are quantities of bits of the data packet, the first data volume information is the same as the second data volume information, that is, the first scheduling information, the second scheduling information, and the third scheduling information are equivalent.

S202: The network device sends the scheduling information to the first terminal device.

In some possible implementations, after determining the first scheduling information or the third scheduling information, the network device may send the first scheduling information or the third scheduling information to the first terminal device by using physical layer signaling or radio resource control (RRC) signaling. In this application, the RRC signaling is equivalent to semi-static signaling or higher-layer signaling, and the three may be used interchangeably. The physical layer signaling may include, for example, downlink control information (DCI), signaling transmitted through a downlink physical layer channel, and the like. A physical downlink channel may be a physical downlink control channel (PDCCH), a physical downlink shared channel (PDSCH), or the like. A type and a name of the physical downlink control channel are not limited in embodiments of this application, and all physical downlink control channels are collectively referred to as PDCCHs. Herein, the physical downlink control channel is a channel used to carry downlink control information, for example, the physical downlink control channel may be an NR-PDCCH or another channel that is newly defined in a future communication protocol and whose function is similar to that of the physical downlink control channel.

In specific implementation, the network device may dynamically, statically, or semi-statically configure the first scheduling information or the third scheduling information for the first terminal device. For example, in a dynamic configuration scenario, each time the first terminal device needs to send a new data packet to the second terminal device, the network device may re-determine a new piece of first scheduling information or third scheduling information, and send the new piece of first scheduling information or third scheduling information to the first terminal device by using the physical layer signaling or RRC signaling. For another example, in a semi-static configuration scenario, when a preset configuration periodicity reaches or a preset configuration trigger event occurs (for example, a quantity of sidelink data packets sent by the first terminal device to the second terminal device reaches a preset upper limit), the network device may re-determine a new piece of first scheduling information or third scheduling information, and send the new piece of first scheduling information or third scheduling information to the first terminal device by using the physical layer signaling or RRC signaling. For another example, in a static configuration scenario, the network device sends the first scheduling information or the third scheduling information only once to the first terminal device. Until the second terminal device completes service data receiving under assistance of the first terminal device, the network device does not configure new first scheduling information or third scheduling information for the first terminal device. The network device may determine, based on an actual application scenario, to dynamically, statically, or semi-statically configure the first scheduling information or the third scheduling information for the first terminal device. This is not specifically limited in this application.

S203: The network device sends the scheduling information to the second terminal device.

In some possible implementations, after determining the second scheduling information or the third scheduling information, the network device may alternatively send the second scheduling information or the third scheduling information to the second terminal device by using the physical layer signaling or RRC signaling. For a specific process, refer to a process that is described in step S202 and in which the first scheduling information or the third scheduling information may be sent to the first terminal device by using the physical layer signaling or RRC signaling. Details are not described herein again.

It should be understood that, in some embodiments, step S202 and step S203 may be a same step. To be specific, the network device sends the scheduling information to the first terminal device and the second terminal device. In this case, the scheduling information may be carried in a multicast message or a broadcast message. This is not limited in this application.

S204: The first terminal device determines the size of the sidelink data packet.

In some possible implementations, after receiving the first scheduling information or the third scheduling information sent by the network device, the first terminal device may extract the first data volume information included in the first scheduling information or the third scheduling information, and determine the size of the sidelink data packet based on the first data volume information. For example, when the first data volume information is a quantity of bits of the downlink data packet, the first terminal device may determine the quantity of bits as the size of the sidelink data packet. For another example, when the first data volume information is the first downlink time-frequency resource and the first downlink coding and modulation information, the first terminal device may count a quantity of time-frequency units (that is, REs) included in the first downlink time-frequency resource. Herein, it is assumed that the quantity is d1. Then, the first terminal device may calculate a quantity of bits of the sidelink data packet based on the quantity d1 of REs and a code rate, modulation scheme information, and spectral efficiency that are included in the first downlink coding and modulation information, to determine the size of the sidelink data packet. For example, it is assumed that d1 is 512, a modulation scheme is QPSK, and the spectral efficiency is 0.2344. It can be learned from the modulation scheme QPSK that, when d1 is 512, a quantity of encoded bits may be determined to be 1024. Because the spectral efficiency is 0.2344, based on a definition of the spectral efficiency, the quantity of bits of the sidelink data packet is calculated to be 120.0128. It can be learned with reference to the code rate that a code rate of 120/1024 is the closest. Therefore, the first terminal device may determine that the size of the sidelink data packet is 120 bits.

Herein, it should be further noted that step S201 to step S204 describe a process in which the network device configures the scheduling information for the first terminal device and the second terminal device. In another optional implementation, the information such as the resource selection rule and the time domain resource or the frequency domain resource of the second time-frequency resource may alternatively be predefined, that is, already clearly specified in a communication protocol of the first terminal device and the second terminal device. In other words, the scheduling information may include only the first data volume information and/or the second data volume information and the first coding and modulation information. Herein, it should be noted that, in this embodiment of this application, "predefined" may be understood as "defined in a protocol". Being configured or preconfigured by the network device may be understood as being configured by using the higher-layer signaling or physical layer signaling.

S205: The second terminal device determines the size of the sidelink data packet.

In some possible implementations, after receiving the second scheduling information or the third scheduling information sent by the network device, the second terminal device may extract the second data volume information included in the second scheduling information or the third scheduling information, and determine the size of the sidelink data packet based on the second data volume information. In specific implementation, when the first data volume information is the quantity of bits of the downlink data packet, the second terminal device may determine the quantity of bits as the size of the sidelink data packet. When the first data volume information is the second downlink time-frequency resource and the second downlink coding and modulation information, the first terminal device may count a quantity of time-frequency units (that is, REs) included in the second downlink time-frequency resource, which is assumed to be $e_1$ herein. Then, the second terminal device may calculate the quantity of bits of the sidelink data packet based on the quantity $e_1$ of REs and a code rate, modulation scheme information, and spectral efficiency that are included in the second downlink coding and modulation information, to determine the size of the sidelink data packet. For example, it is assumed that $e_1$ is 512, a modulation scheme is QPSK, and the spectral efficiency is 0.2344. It can be learned from the modulation scheme QPSK that, when $e_1$ is 512, a quantity of encoded bits may be determined to be 1024. Because the spectral efficiency is 0.2344, based on a definition of the spectral efficiency, the quantity of bits of the sidelink data packet is calculated to be 120.0128. It can be learned with reference to the code rate that a code rate of 120/1024 is the closest. Therefore, the second terminal device may determine that the size of the sidelink data packet is 120 bits.

S206: The first terminal device determines, based on the size of the sidelink data packet, a first quantity of time-frequency units corresponding to the sidelink data packet.

In some possible implementations, after determining the size of the sidelink data packet, the first terminal device may determine, based on the size of the sidelink data packet and the first coding and modulation information, a quantity of REs that can be occupied by the sidelink data packet. In specific implementation, the first terminal device may further extract spectral efficiency included in the first coding and modulation information. Then, the first terminal device may determine a ratio of the obtained size of the data packet to the spectral efficiency as the foregoing first quantity. For example, it is assumed that the first coding and modulation information is the coding and modulation information 2 described above, that is, a modulation scheme is QPSK, a code rate is 190/1024, spectral efficiency is 0.3770, and a size of the sidelink data packet is 100 bits. The first terminal device may calculate that a ratio of the size of the sidelink data packet to the spectral efficiency is 100/0.3770, and may determine that the first quantity is about 265.25. Optionally, when the calculated ratio is not an integer, the first terminal device may further round down the ratio or round up the ratio, and determine the first quantity based on the rounded ratio. For example, assuming that the first terminal device can calculate that the ratio of the size of the sidelink data packet to the spectral efficiency is about 265.25, it may be determined that the first quantity is 265 or 266. Certainly, it should be understood that a method for performing data rounding by the first terminal device is not limited to rounding up or rounding down, and another rounding method may also be used. This is not specifically limited in this application.

S207: The second terminal device determines, based on the size of the sidelink data packet, the first quantity of time-frequency units corresponding to the sidelink data packet.

In some possible implementations, after determining the size of the sidelink data packet, the second terminal device may determine, based on the size of the sidelink data packet and first decoding and demodulation information corresponding to the first coding and modulation information, the first quantity of REs that can be occupied by the sidelink data packet. In specific implementation, because the first coding and modulation information and the first decoding and demodulation information are corresponding to each other, for a process in which the second terminal device determines, based on the size of the sidelink data packet and the first decoding and demodulation information, the first quantity of REs that can be occupied by the sidelink data packet, refer to a process that is described in step S206 and in which the first terminal device determines, based on the size of the sidelink data packet and the first coding and modulation information, the first quantity of REs that can be occupied by the sidelink data packet. Details are not described herein again.

S208: The first terminal device determines a first frequency domain resource or a second time domain resource of the second time-frequency resource based on the first quantity, the first time domain resource or the second frequency domain resource of the second time-frequency resource, and the resource selection rule.

In some possible implementations, after obtaining the first quantity of REs, the first terminal device may further extract, from the first scheduling information or the third scheduling information, the first time domain resource or the second frequency domain resource, the resource selection rule, and the first coding and modulation information that are preconfigured in the second time-frequency resource. Then, the first frequency domain resource or the second time domain resource that is actually occupied is determined based on the first quantity, the first time domain resource or the second frequency domain resource, the resource selection rule, and the first coding and modulation information.

Optionally, in a scenario in which the first time domain resource is preconfigured, after obtaining the first quantity of REs, the first terminal device may further obtain a second quantity of slots included in the first time domain resource. Then, a quantity of RBs included in the first frequency domain resource of the second time-frequency resource is determined based on the first quantity and the second quantity. Specifically, it is assumed that one slot includes N1 symbols. A quantity of subcarriers included in one resource block is N2. The first terminal device may calculate, according to a formula $$R2 = \frac{T1}{R1 \times N1 \times N2},$$

a quantity of N2 consecutive subcarriers included in the first frequency domain resource. Herein, R1 is the second quantity, T1, R1, N1, R2, and N2 are positive integers greater than 0, a preset condition is met between T1 and the first quantity, and T1 is a quantity of time-frequency units included in the second time-frequency resource. The preset condition includes that T1 is a largest positive integer among all positive integers less than or equal to the first quantity, or that T1 is a smallest positive integer among all positive integers greater than the first quantity. Because T1, R1, N1, R2, and N2 are all positive integers greater than 0, when R1, N1, and N2 are all known, R2 may be a plurality of positive integer values. Until a positive integer d2 is substituted into the foregoing formula, the preset condition may be met between T1 and the first quantity. In this case, the first terminal device may determine d2 as a third quantity of N2 consecutive subcarriers included in the first frequency domain resource.

For example, it is assumed that the first time domain resource is a slot whose sequence number is i (that is, the first time domain resource is a slot 1), one slot includes 14 symbols, and the first quantity is 265. A quantity $$R2 = \frac{T1}{1 \times 12 \times 14}$$

of 12 consecutive subcarriers may be obtained through substitution into the foregoing formula. When R2 is 1, a value of T1 is 168. When R2 is 2, a value of T1 is 336. On a premise that the formula $$R2 = \frac{T1}{1 \times 12 \times 14}$$

is satisfied, 168 is the one with the largest value among all positive integers less than 265, and 336 is the one with the smallest value among all positive integers greater than 265. If the preset condition used by the first terminal device is that T1 is the largest positive integer among all positive integers less than or equal to the first quantity, the first terminal device may determine that the third quantity R2 is equal to 1. If the preset condition used by the first terminal device is that T1 is the smallest positive integer among all positive integers greater than the first quantity, the first terminal device may determine that the third quantity R2 is equal to 2. Herein, a quantity of first frequency domain units included in the frequency domain resource of the second time-frequency resource is calculated based on an objectively existing association relationship between the quantity of first frequency domain units included in the second time-frequency resource, a quantity of second time domain units, and a quantity of included time-frequency units in the second time-frequency resource. It can be ensured that the obtained third quantity is true and reliable. This ensures accuracy of the subsequently determined second time-frequency resource. In addition, the quantity of time-frequency units included in the second time-frequency resource is quantized based on the preset condition, so that the determined second time-frequency resource matches a minimum time-frequency unit used when the sidelink data packet is actually transmitted. This ensures reliability of subsequent sidelink data packet transmission.

After the first terminal device determines the third quantity, the first terminal device may select, from the frequency domain resource of the first time-frequency resource based on the third quantity and the resource selection rule, a plurality of N2 consecutive subcarriers that are actually to be occupied by the sidelink data packet. For example, it is assumed that a time domain resource of the first time-frequency resource is a total of 10 slots from a slot 0 to a slot 9, where a slot with a larger sequence number is after a slot with a smaller sequence number in time domain. It is assumed that a frequency domain resource of the first time-frequency resource is a total of 10 resource blocks from a resource block 0 to a resource block 9. In frequency domain, a resource block with a larger sequence number has a higher frequency than a resource block with a smaller sequence number. On a premise that the first time domain resource is the slot 1, the first terminal device determines that the first frequency domain resource includes two resource blocks. Then, the first terminal device may select two idle specific resource blocks from the 10 resource blocks in ascending order or descending order based on a sequence number of each resource block, and determine the two idle specific resource blocks as the first frequency domain resource. For example, the first terminal device may sequentially query for available subcarriers in descending order. The first terminal device first checks whether a resource block 8 and the resource block 9 are in an idle state. If the first terminal device determines that the resource block 8 and the resource block 9 are in the idle state, the resource block 8 and the resource block 9 may be determined as the first frequency domain resource. If the first terminal device determines that the resource block 8 and the resource block 9 are not in the idle state, the first terminal device may continue to determine whether a resource block 7 and the resource block 8 are in the idle state. The rest can be deduced by analogy. Certainly, it may be understood that the resource selection rule may be implemented in another different manner. This is not specifically limited in this application. Herein, a first frequency domain unit included in the frequency domain resource of the second time-frequency resource is determined from the first time-frequency resource based on the sequence number. This is simple and easy to implement. In addition, using a unified and definite resource selection rule by the second terminal device subsequently can also ensure consistency of second time-frequency resources determined by the first terminal device and the second terminal device.

Optionally, in a scenario in which the second frequency domain resource is preconfigured, after obtaining the first quantity of REs, the first terminal device may further obtain a fourth quantity of N2 consecutive subcarriers included in the second frequency domain resource. Then, a fifth quantity of symbols included in the second time domain resource of the second time-frequency resource is determined based on the first quantity and the fourth quantity. Specifically, it is assumed that one RB is corresponding to N2 consecutive subcarriers in frequency domain (that is, N2 consecutive subcarriers are used as first frequency domain units). The first terminal device may calculate, according to a formula $$R4 = \frac{T2}{R3 \times N2},$$

the fifth quantity R4 of symbols included in the second time domain resource. Herein, T2, R3, R4, and N2 are positive integers greater than 0, and a preset condition is met between T2 and the first quantity. The preset condition includes that T2 is a largest positive integer among all positive integers less than or equal to the first quantity, or that T2 is a smallest positive integer among all positive integers greater than the first quantity. Because T2, R3, N2, and R4 are all positive integers greater than 0, when R3, N2, and the first quantity are all known, R4 may be a plurality of positive integer values. Until a positive integer d4 is substituted into the foregoing formula, the preset condition may be met between T2 and the first quantity. In this case, the first terminal device may determine d4 as the fifth quantity of symbols included in the second time domain resource.

For example, it is assumed that the second frequency domain resource is two resource blocks whose sequence numbers are 1 and 2, the first quantity is 265, and the fifth quantity $$R4 = \frac{T2}{2 \times 12}$$

of symbols included in the second time domain resource may be obtained through substitution into the foregoing formula. When R4 is 11, T2 is 264. When R4 is 12, T3 is 288. On a premise that the formula $$R4 = \frac{T2}{2 \times 12}$$

is satisfied, 264 is the one with the largest value among all positive integers less than 265, and 288 is the one with the smallest value among all positive integers greater than 265. If the preset condition used by the first terminal device is that T2 is the largest positive integer among all positive integers less than or equal to the first quantity, the first terminal device may determine that the fifth quantity R4 is equal to 11. If the preset condition used by the first terminal device is that T2 is the smallest positive integer among all positive integers greater than the first quantity, the first terminal device may determine that the fifth quantity R4 is equal to 12. Herein, because an association relationship between a quantity of second time domain units in the second time-frequency resource, the quantity of first frequency domain units, and a quantity of time-frequency units included in the second time-frequency resource exists objectively, according to the foregoing formula, it can also be ensured that a calculated fifth quantity is true and reliable. This ensures accuracy of the subsequently determined second time-frequency resource. In addition, the quantity of time-frequency units included in the second time-frequency resource is quantized based on the preset condition, so that the determined second time-frequency resource matches a minimum time-frequency unit used when the sidelink data packet is actually transmitted. This ensures reliability of subsequent sidelink data packet transmission.

After the first terminal device determines the fifth quantity, the first terminal device may select, from a time domain resource of the first time-frequency resource based on the fifth quantity and the resource selection rule, a plurality of symbols that are actually to be occupied by the sidelink data packet. For example, it is assumed that the time domain resource of the first time-frequency resource is a slot 0 to a slot 9, and each slot includes a total of 14 symbols from a symbol 0 to a symbol 13. In time domain, a slot with a larger sequence number follows a slot with a smaller sequence number, and a symbol with a larger sequence number follows a symbol with a smaller sequence number. After determining the fifth quantity of symbols (which is assumed to be ii herein) included in the second time domain resource, the first terminal device may select one idle slot from the 10 consecutive slots in ascending order or descending order of sequence numbers based on a sequence number of each slot. Then, ii idle symbols are selected from the idle slot in descending order or ascending order of sequence numbers, and the 11 idle symbols are determined as the second time domain resource. Certainly, it may be understood that the resource selection rule may be implemented in another different manner. This is not specifically limited in this application. Herein, the first terminal device determines a second time domain unit included in the time domain resource of the second time-frequency resource from the first time-frequency resource based on a sequence number of the second time domain unit. This is simple and easy to implement. In addition, using a unified and definite resource selection rule by the second terminal device subsequently can also ensure consistency of second time-frequency resources determined by the first terminal device and the second terminal device.

S209: The second terminal device determines a first frequency domain resource or a second time domain resource of the second time-frequency resource based on the first quantity, the first time domain resource or the second frequency domain resource of the second time-frequency resource, and the resource selection rule.

In some possible implementations, after obtaining the first quantity of REs, the second terminal device may further extract, from the second scheduling information or the third scheduling information, the first time domain resource or the second frequency domain resource, the resource selection rule, and the first coding and modulation information that are preconfigured in the second time-frequency resource. Then, the first frequency domain resource or the second time domain resource that is actually occupied is determined based on the first quantity, the first time domain resource or the second frequency domain resource, the resource selection rule, and the first coding and modulation information. For a specific process in which the second terminal device determines the first frequency domain resource or the second time domain resource, refer to a process that is described in step S208 and in which the first terminal device determines the first frequency domain resource or the second time domain resource. Details are not described herein again.

Herein, the second terminal device actively calculates, based on the size of the sidelink data packet, scheduling information used for performing sidelink communication with the first terminal device, and the like, the second time-frequency resource required for receiving the sidelink data packet. Therefore, a waste of sidelink control resources caused by frequent sending of the second time-frequency resource by the first terminal device to the second terminal device can be avoided, and resource utilization of the communication system can be improved.

S210: The first terminal device sends the sidelink data packet to the second terminal device on the second time-frequency resource.

In some possible implementations, after determining the time domain resource and the frequency domain resource of the second time-frequency resource, the first terminal device may encode and modulate the sidelink data packet, to obtain modulation symbols corresponding to the sidelink data packet. Then, the modulation symbols are mapped to the second time-frequency resource according to a predefined resource mapping rule or a resource mapping rule configured by the network device, to send the sidelink data packet to the second terminal device. In addition, the second terminal device may also receive the sidelink data packet from the second time-frequency resource based on the resource mapping rule and decoding and demodulation information corresponding to the first coding and modulation information. Herein, the resource mapping rule is a mapping sequence that needs to be followed when the first terminal device one-to-one maps the modulation symbols corresponding to the sidelink data packet to each RE in the second time-frequency resource. For example, the resource mapping rule may indicate that when performing resource mapping, the first terminal device needs to comply with a principle of performing resource mapping in time domain first and based on sequence numbers in descending order or ascending order. Alternatively, the resource mapping rule may indicate that when performing resource mapping, the first terminal device needs to comply with a principle of performing resource mapping in frequency domain first and based on sequence numbers in descending order or ascending order. Certainly, it may be understood that the resource mapping rule may further indicate another different mapping rule. This is not specifically limited in this application.

In specific implementation, after determining the time domain resource and the frequency domain resource of the second time-frequency resource, the first terminal device may first encode and modulate the sidelink data packet based on information such as a modulation method and the code rate included in the first coding and modulation information, to obtain a plurality of modulation symbols corresponding to the sidelink data packet (where it is assumed herein that a quantity of modulation symbols is A1). If the first terminal device determines that A1 is not equal to a quantity of REs included in the second time-frequency resource (where it is assumed herein that the quantity is A2), the first terminal device may adjust the quantity A1 in a manner such as rate matching, so that adjusted A1 is equal to A2. For example, when A1 is not equal to A2, the first terminal device may re-use different modulation and coding information, that is, use a new code rate to perform channel coding, so that a quantity A1 of modulation symbols after re-coding is equal to A2. Alternatively, when A1 is greater than A2, the first terminal device may perform puncturing processing on the modulation symbols, that is, the first terminal device may remove some redundant bits from coded bits corresponding to the sidelink data packet or redundant symbols from the modulation symbols, so that a quantity A1 of modulation symbols after adjustment is equal to A2. When A2 is greater than A1, the first terminal device may further perform a repeated operation on coded bits or modulation symbols corresponding to the sidelink data packet, so that a quantity A1 of modulation symbols after the repeated operation is equal to A2. Here, the repeated operation is to insert a coded bit b3 between a coded bit b1 and an adjacent coded bit b2, where the coded bit b3 is the same as the coded bit b1. Alternatively, a modulation symbol c3 is inserted between a modulation symbol c1 and an adjacent modulation symbol c2, where the modulation symbol c3 is the same as the modulation symbol c1.

Herein, it should be further noted that, before rate matching is performed, if the first terminal device determines that some REs in the second time-frequency resource are occupied, the first terminal device needs to remove these occupied REs, and determine a quantity of removed REs as a quantity of REs corresponding to the second time-frequency resource. In other words, a quantity of REs in the second time-frequency resource determined by a terminal device is a total quantity of all unoccupied REs.

Figure 3:
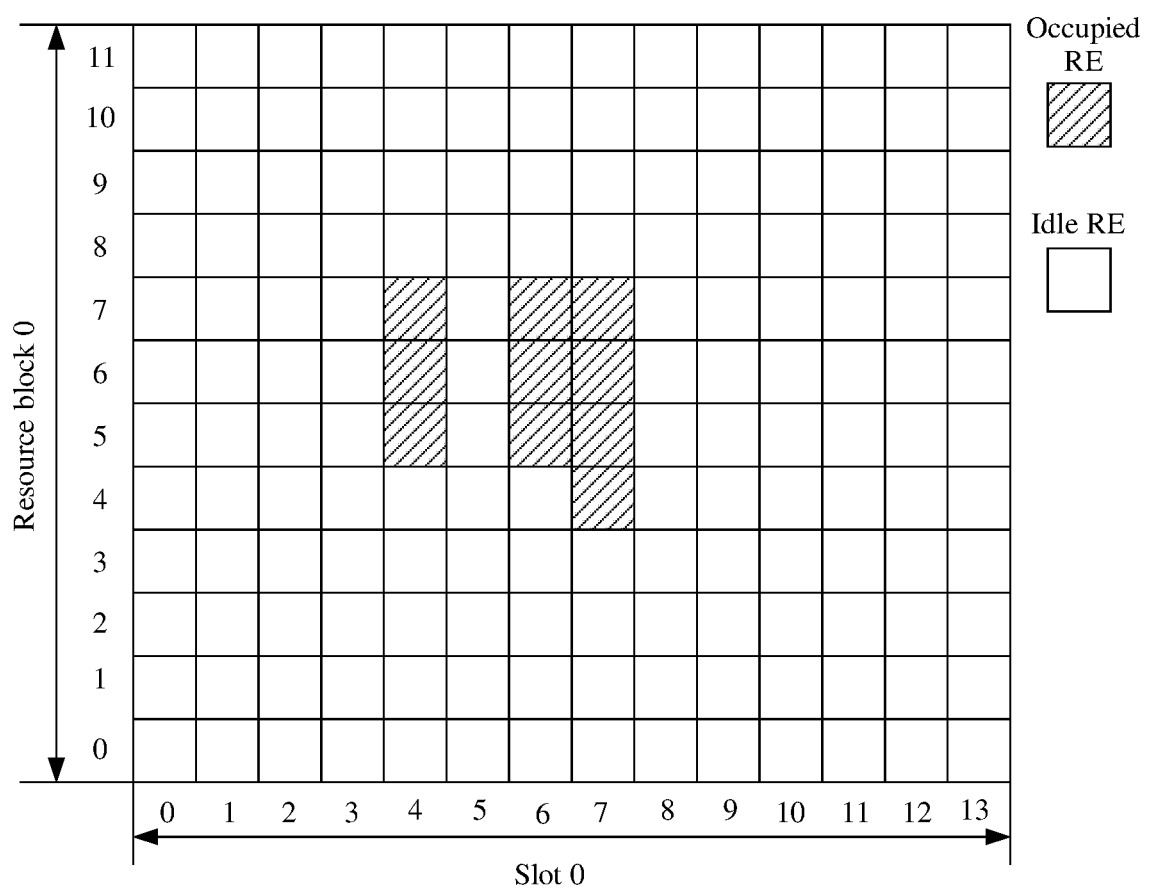
FIG. 3 is a schematic diagram of a structure of a second time-frequency resource according to an embodiment of this application.

After the first terminal device determines that the quantity A1 of modulation symbols is equal to the quantity A2 of REs, the first terminal device may respectively map the A1 modulation symbols one-to-one to the A2 REs in a mapping sequence specified in the resource mapping rule. In this way, the sidelink data packet is sent to the second terminal device by using the second time-frequency resource. For example, FIG. 3 is a schematic diagram of a structure of a second time-frequency resource according to an embodiment of this application. As shown in FIG. 3, the second time-frequency resource includes a resource block 0 and a slot 0, that is, includes 12*14=168 REs in total. In addition, because a total of 10 REs in a symbol 5, a symbol 7, and a symbol 8 are occupied, the second time-frequency resource includes 158 idle REs. After performing rate matching, the first terminal device needs to respectively map 158 modulation symbols to 158 idle REs. For example, it is assumed that the resource mapping rule indicates that time domain is first and mapping is performed in ascending order of arrangement. In this case, the first terminal device may map the first modulation symbol of the 158 modulation symbols to an RE corresponding to a symbol 0 and a subcarrier 0, and then, map the second modulation symbol to an RE corresponding to the symbol 0 and a subcarrier 1. If the RE corresponding to the symbol 0 and the subcarrier 1 is occupied, the first terminal device may map the second modulation symbol to an RE corresponding to the symbol 0 and a subcarrier 2. When all 12 REs corresponding to the symbol 0 and the subcarrier 0 to a subcarrier 11 are occupied, the first terminal device may perform modulation symbol mapping on REs one by one, starting from the RE corresponding to the symbol 0 and the subcarrier 0. The rest can be deduced by analogy. For another example, it is assumed that the resource mapping rule indicates that frequency domain is first and mapping is performed in descending order of arrangement. In this case, the first terminal device may map the first modulation symbol of 158 modulation symbols to an RE corresponding to a subcarrier 12 and the symbol 0, and then, map the second modulation symbol to an RE corresponding to the subcarrier 12 and a symbol 1. If the RE is occupied, the first terminal device may map the second modulation symbol to an RE corresponding to the subcarrier 12 and a symbol 2. When all 14 REs corresponding to the subcarrier 12 and the symbol 0 to a symbol 13 are occupied, the first terminal device may perform modulation symbol mapping on REs one by one, starting from the RE corresponding to the subcarrier 11 and the symbol 0. The rest can be deduced by analogy. After the 158 modulation symbols are mapped to the 158 REs one by one, the first terminal device may send the sidelink data packet to the second terminal device on the 158 REs.

Without considering a communication delay, the second terminal device may simultaneously receive the sidelink data packet on the second time-frequency resource. Specifically, the second terminal device receives the modulation symbols corresponding to the sidelink data packet on the second time-frequency resource, and then performs signal demodulation and channel decoding on the modulation symbols based on decoding and demodulation information corresponding to first coding and modulation information, to finally obtain the sidelink data packet.

In addition, it should be further noted that the sidelink data packet sending and receiving method provided in this embodiment of this application is not only applicable to a UE cooperation scenario in which the first terminal device assists the second terminal device in receiving downlink data from the network device, but also applicable to a scenario in which the first terminal device assists the second terminal device in uploading uplink data to the network device In some embodiments, in a process of sending or receiving a sidelink data packet, both the first terminal device and the second terminal device may calculate, based on information such as a size of the to-be-transmitted sidelink data packet and scheduling information used in the transmission process, a second time-frequency resource used for transmitting the sidelink data packet. This avoids a waste of sidelink control resources caused by frequent exchange of the second time-frequency resource between the first terminal device and the second terminal device, and improves utilization of communication resources and applicability of the communication system.

Figure 4:
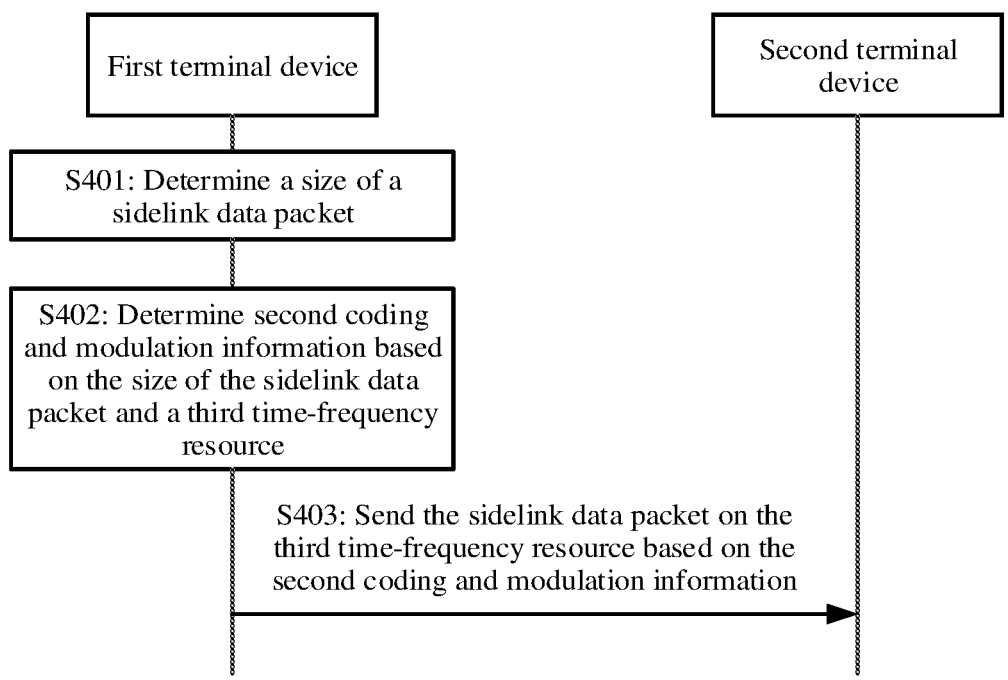
FIG. 4 is another schematic flowchart of a sidelink data packet sending and receiving method according to an embodiment of this application.

FIG. 4 is another schematic flowchart of a sidelink data packet sending and receiving method according to an embodiment of this application. The sidelink data packet sending and receiving method is applicable to the communication system shown in FIG. 1. Because processes of determining coding and modulation information that are in a process in which a first terminal device sends a sidelink data packet to a second terminal device and a process in which the first terminal device receives the sidelink data packet from the second terminal device are the same, in some embodiments, a scenario in which the first terminal device sends the sidelink data packet to the second terminal device (that is, the first terminal device is a transmit end, and the second terminal device is a receive end) is used as an example, to specifically describe a process in which the first terminal device determines the modulation and coding information used for sending the sidelink data packet. It can be learned from FIG. 4 that the method includes the following steps.

S401: A first terminal device determines a size of a sidelink data packet.

In some possible implementations, the first terminal device may receive data volume information that is delivered by a network device and that is used to indicate the size of the sidelink data packet, and then determine the size of the sidelink data packet based on the data volume information. Specifically, the data volume information may be downlink scheduling information used when the network device sends a downlink data packet corresponding to the sidelink data packet. The downlink scheduling information includes a downlink time-frequency resource, downlink coding and modulation information, and the like. Alternatively, the data volume information may be a quantity of bits of the downlink data packet. When the data volume information is the quantity of bits of the downlink data packet, the first terminal device may determine the quantity of bits as the size of the sidelink data packet. When the data volume information is the downlink time-frequency resource and the downlink coding and modulation information, the first terminal device may count a quantity of time-frequency units (that is, REs) included in the downlink time-frequency resource, which is assumed to be d4 herein. Then, the first terminal device may calculate the quantity of bits of the sidelink data packet based on the quantity d4 of REs and a code rate, modulation scheme information, and spectral efficiency that are included in the downlink coding and modulation information, to determine the size of the sidelink data packet. For example, it is assumed that d4 is 512, a modulation scheme is QPSK, and the spectral efficiency is 0.2344. It can be learned from the modulation scheme QPSK that, when d4 is 512, a quantity of encoded bits may be determined to be 1024. Because the spectral efficiency is 0.2344, based on a definition of the spectral efficiency, the quantity of bits of the sidelink data packet is calculated to be 120.0128. It can be learned with reference to the code rate that a code rate of 120/1024 is the closest. Therefore, the first terminal device may determine that the size of the sidelink data packet is 120 bits.

Optionally, before the first terminal device determines the size of the sidelink data packet, the network device may preconfigure, for the first terminal device and a second terminal device, scheduling information required for transmitting the sidelink data packet. The scheduling information may include a time-frequency resource used to transmit the sidelink data packet (for differentiation, described as a third time-frequency resource in the following), an available coding and modulation information set, and a corresponding resource mapping rule. Herein, the foregoing coding and modulation information set includes N3 types of coding and modulation information including second coding and modulation information. Further, the coding and modulation information set may be specifically the MCS indication table described above. Alternatively, the third time-frequency resource, the coding and modulation information set, and the resource mapping rule may be predefined by the first terminal device and the second terminal device. This is not specifically limited in this application. In this embodiment of this application, "predefined" may be understood as "defined in a protocol". Being configured or preconfigured by the network device may be understood as being configured by using higher-layer signaling or physical layer signaling.

S402: The first terminal device determines the second coding and modulation information based on the size of the sidelink data packet and the preset third time-frequency resource.

In some possible implementations, the first terminal device may further determine the second coding and modulation information based on the size of the sidelink data packet and the preset third time-frequency resource.

In specific implementation, the first terminal device may further determine a product of a quantity of second time domain units included in the third time-frequency resource and a quantity of second frequency domain units as a quantity of REs included in a third time-frequency unit (assuming that the quantity is d6 herein). It should be noted herein that if one or more REs in the third time-frequency resource are occupied, the first terminal device may determine a difference between the product of the quantity of second time domain units and the quantity of second frequency domain units and a quantity of occupied REs as a quantity d6 of REs included in the third time-frequency resource. Then, it can be learned based on the definition of the spectral efficiency that the first terminal device may calculate d5/d6, and determine the d5/d6 as first spectral efficiency of transmitting the sidelink data packet on the third time-frequency resource. Then, a terminal device may select, based on the first spectral efficiency, coding and modulation information that meets a preset coding and modulation information matching rule from a coding and modulation information set that is preconfigured or predefined by the network device (for ease of differentiation, described as the second coding and modulation information in the following). Herein, spectral efficiency corresponding to the second coding and modulation information (for ease of differentiation, described as second spectral efficiency in the following) and the first spectral efficiency meet a constraint relationship specified by the coding and modulation information matching rule. Specifically, the coding and modulation information matching rule includes the second spectral efficiency corresponding to a second coding and modulation scheme is less than the first spectral efficiency, and a difference between the second spectral efficiency and the first spectral efficiency is the smallest, or the second spectral efficiency corresponding to a second coding and modulation scheme is greater than or equal to the first spectral efficiency, and a difference between the second spectral efficiency and the first spectral efficiency is the smallest. In other words, in the coding and modulation information set, the second spectral efficiency is a type of spectral efficiency closest to the first spectral efficiency in all types of spectral efficiency. Certainly, it may be understood that the coding and modulation information matching rule may be implemented in another different manner. This is not specifically limited in this application.

For example, it is assumed that the foregoing coding and modulation information set is the MCS indication table shown in Table 1-1, a size d5 of the sidelink data packet is 800 bits, a frequency domain resource of the third time-frequency resource is a resource block 1 to a resource block 5, and the time domain resource of the third time-frequency resource is a slot 3 to a slot 5 after the last symbol of a PDSCH. The first terminal device may first determine that the quantity of REs included in the third time-frequency resource is 5*12*3*14=2520, that is, d6 is 2520. Then, the first terminal device may calculate that the first spectral efficiency is d5/d6=800/2520, which is about 0.32. According to Table 1-1, spectral efficiency included in coding and modulation information with a sequence number 1 is 0.3066. The spectral efficiency is less than the first spectral efficiency and is closest to the first spectral efficiency in all types of spectral efficiency less than the first spectral efficiency. Spectral efficiency included in coding and modulation information with a sequence number 2 is 0.3770. The spectral efficiency is greater than the first spectral efficiency and is closest to the first spectral efficiency in all types of spectral efficiency greater than the first spectral efficiency. Therefore, when the coding and modulation information matching rule is that the second spectral efficiency corresponding to the second coding and modulation information is less than the first spectral efficiency and the difference between the second spectral efficiency and the first spectral efficiency is the smallest, the first terminal device may determine the coding and modulation information with the sequence number 1 as the second coding and modulation information. When the coding and modulation information matching rule is that the second spectral efficiency corresponding to the second coding and modulation information is greater than or equal to the first spectral efficiency and the difference between the second spectral efficiency and the first spectral efficiency is the smallest, the first terminal device may determine the coding and modulation information with the sequence number 2 as the second coding and modulation information.

S403: The first terminal device sends the sidelink data packet to the second terminal device on the third time-frequency resource based on the second coding and modulation information.

In some possible implementations, after determining the second coding and modulation information, the first terminal device may perform channel coding and signal modulation on the sidelink data packet based on the code rate and the modulation scheme information that are indicated by the second coding and modulation information. Then, obtained modulation symbols are mapped to the third time-frequency resource according to the preset resource mapping rule. In this way, the sidelink data packet is sent to the second terminal device on the third time-frequency resource. For a process in which the first terminal device performs channel coding, signal modulation, and resource mapping on the sidelink data packet, refer to the process that is described in step S210 and in which the first terminal device performs channel coding, signal modulation, and resource mapping on the sidelink data. Details are not described herein again. In addition, the second terminal device may simultaneously receive the sidelink data packet on a second time-frequency resource. Specifically, the second terminal device receives the modulation symbols corresponding to the sidelink data packet on the second time-frequency resource, and then performs signal demodulation and channel decoding on the modulation symbols based on decoding and demodulation information corresponding to the second coding and modulation information, to finally obtain the sidelink data packet.

In this embodiment of this application, the first terminal device may select applicable coding and modulation information from the preset coding and modulation information set based on the size of the sidelink data packet and the third time-frequency resource preconfigured or predefined by the network device. Therefore, when a time-frequency resource is fixed, effective transmission of the sidelink data packet is ensured, and practicability and applicability of the communication system are improved.

Figure 5:
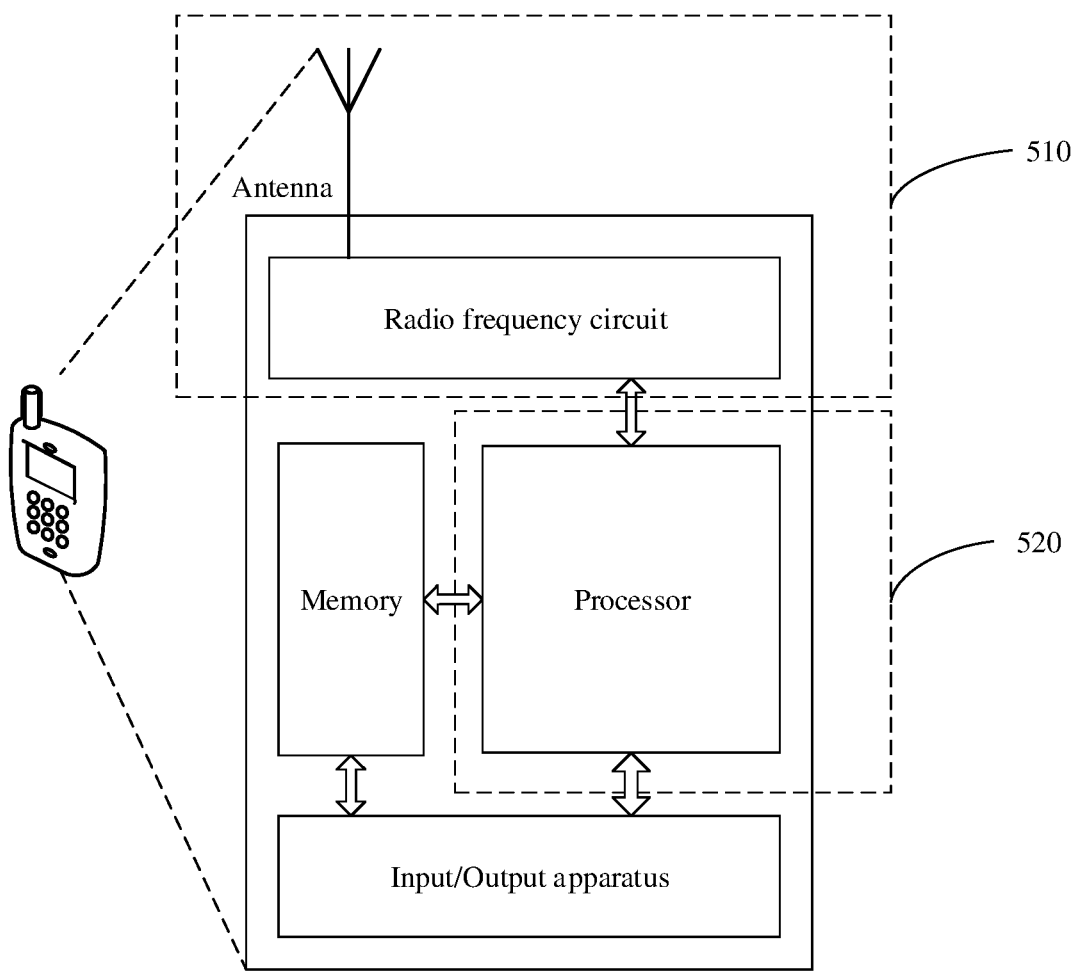
FIG. 5 is a schematic diagram of a structure of a communication apparatus according to an embodiment of this application.

FIG. 5 is a schematic diagram of a structure of a communication apparatus according to an embodiment of this application. The communication apparatus may be the first terminal device described in the foregoing embodiments, and the communication apparatus may be configured to perform functions of the first terminal device in the foregoing embodiments. For ease of description, FIG. 5 shows only main components of the communication apparatus. It can be learned from FIG. 5 that the communication apparatus includes a processor, a memory, a radio frequency circuit, an antenna, and an input/output apparatus. The processor is mainly configured to process a communication protocol and communication data, control the communication apparatus, execute a software program, process data of the software program, and the like. The memory is configured to store the software program and data. The radio frequency circuit is mainly configured to perform conversion between a baseband signal and a radio frequency signal, and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user using the communication apparatus and output data to the user. It should be noted that, in some scenarios, the communication apparatus may not include the input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, only one memory and one processor are shown in FIG. 5. In an actual communication apparatus product, there may be one or more processors and one or more memories. The memory may also be referred to as a storage medium, a storage device, or the like. The memory may be independent of the processor, or may be integrated with the processor. This is not limited in this embodiment of this application.

In an optional implementation, the processor may include a baseband processor and/or a central processing unit. The baseband processor is mainly configured to process a communication protocol and communication data. The central processing unit is mainly configured to control the entire terminal device, execute a software program, and process data of the software program. The processor in FIG. 5 may integrate functions of the baseband processor and the central processing unit. A person skilled in the art may understand that, alternatively, the baseband processor and the central processing unit may be independent processors, and interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in a storage unit in a form of a software program. The processor executes the software program to implement a baseband processing function.

In this embodiment of this application, the antenna and the radio frequency circuit that have receiving and sending functions may be considered as a transceiver unit of the communication apparatus, and the processor that has a processing function may be considered as a processing unit of the communication apparatus. As shown in FIG. 5, the communication apparatus includes a transceiver unit 510 and a processing unit 520. Herein, the transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 510 and that is configured to implement a receiving function may be considered as a receiving unit, and a component that is in the transceiver unit 510 and that is configured to implement a sending function may be considered as a sending unit, that is, the transceiver unit 510 includes a receiving unit and a sending unit. Herein, the receiving unit may also be sometimes referred to as a receiving machine, a receiver, a receiving circuit, or the like. The sending unit may also be sometimes referred to as a transmitter machine, a transmitter, a transmitting circuit, or the like.

For example, in an implementation, the processing unit 510 is configured to determine a size of a sidelink data packet. The processing unit 510 is further configured to determine, based on the size of the sidelink data packet, a first quantity of time-frequency units corresponding to the sidelink data. The processing unit 510 is further configured to determine a first frequency domain resource of a second time-frequency resource from a first time-frequency resource based on the first quantity, a first time domain resource of the second time-frequency resource, and a resource selection rule, or determine a second time domain resource of a second time-frequency resource from a first time-frequency resource based on the first quantity, a second frequency domain resource of the second time-frequency resource, and a resource selection rule. The transceiver unit 520 is configured to send the sidelink data packet to the second terminal device or receive the sidelink data packet from the second terminal device on the second time-frequency resource.

For example, in an implementation, the first time domain resource of the second time-frequency resource or the second frequency domain resource of the second time-frequency resource is predefined, or the first time domain resource of the second time-frequency resource or the second frequency domain resource of the second time-frequency resource is scheduled by a network device.

For example, in an implementation, the resource selection rule is predefined or configured by the network device, and the resource selection rule includes selecting at least one second time domain unit from second time domain units based on a sequence number of each second time domain unit included in the first time-frequency resource, where the sequence numbers of the second time domain units are used to indicate a sequence of the second time domain units in time domain, and/or selecting at least one first frequency domain unit based on a sequence number of each first frequency domain unit included in the first time-frequency resource, where the sequence numbers of the first frequency domain units are used to indicate a sequence of the first frequency domain units in frequency domain.

For example, in an implementation, the processing unit 510 is configured to determine a second quantity of first time domain units included in the first time domain resource of the second time-frequency resource, determine, based on the second quantity and the first quantity, a third quantity of first frequency domain units included in the first frequency domain resource of the second time-frequency resource, and determine the first frequency domain resource from the first time-frequency resource based on the third quantity and a resource allocation rule.

For example, in an implementation, the first time domain unit includes N1 second time domain units, the first frequency domain unit includes N2 second frequency domain units, and the third quantity, the second quantity, and the first quantity meet the following relational expression:

$$R2 = \frac{T1}{R1 \times N1 \times N2}$$

R2 is the third quantity of first frequency domain units included in the first frequency domain resource, R1 is the second quantity, T1, R1, N1, R2, and N2 are positive integers greater than 0, a preset condition is met between T1 and the first quantity, and T1 is a quantity of time-frequency units included in the second time-frequency resource.

For example, in an implementation, the preset condition includes T1 is a largest positive integer among all positive integers less than or equal to the first quantity, or T1 is a smallest positive integer among all positive integers greater than the first quantity.

For example, in an implementation, the processing unit 510 is configured to determine a fourth quantity of first frequency domain units included in a second frequency domain resource of the second time-frequency resource, determine, based on the fourth quantity and the first quantity, a fifth quantity of second time domain units included in the second time domain resource of the second time-frequency resource, and determine the second time domain resource from the first time-frequency resource based on the fifth quantity and a resource allocation rule.

For example, in an implementation, the first time domain unit includes a plurality of second time domain units, the first frequency domain unit includes N2 second frequency domain units, and the fourth quantity, the fifth quantity, and the first quantity meet the following relational expression:

$$R4 = \frac{T2}{R3 \times N2}$$

R4 is a fifth quantity of second time domain units included in the second time domain resource, R3 is the fourth quantity, T2, R3, N2, and R4 are positive integers greater than 0, a preset condition is met between T2 and the first quantity, and T2 is a quantity of time-frequency units included in the second time-frequency resource.

For example, in an implementation, the preset condition includes T2 is a largest positive integer among all positive integers less than or equal to the first quantity, or T2 is a smallest positive integer among all positive integers greater than the first quantity.

It should be noted that the communication apparatus may be a first terminal device, or may be a chip used in the first terminal device, or another combined device, another component, or the like that can implement a function of the first terminal device. When the communication apparatus is the first terminal device, the transceiver may be a transmitter and a receiver, or an integrated transceiver, and may include an antenna, a radio frequency circuit, and the like. The processing unit may be a processor, for example, a baseband chip. When the communication apparatus is a component having functions of the first terminal device, the transceiver may be a radio frequency unit, and the processing module may be a processor. When the communication apparatus is a chip system, the transceiver unit may be an input/output interface of the chip system, and the processing unit may be a processor of the chip system, for example, a central processing unit (CPU).

Figure 6:
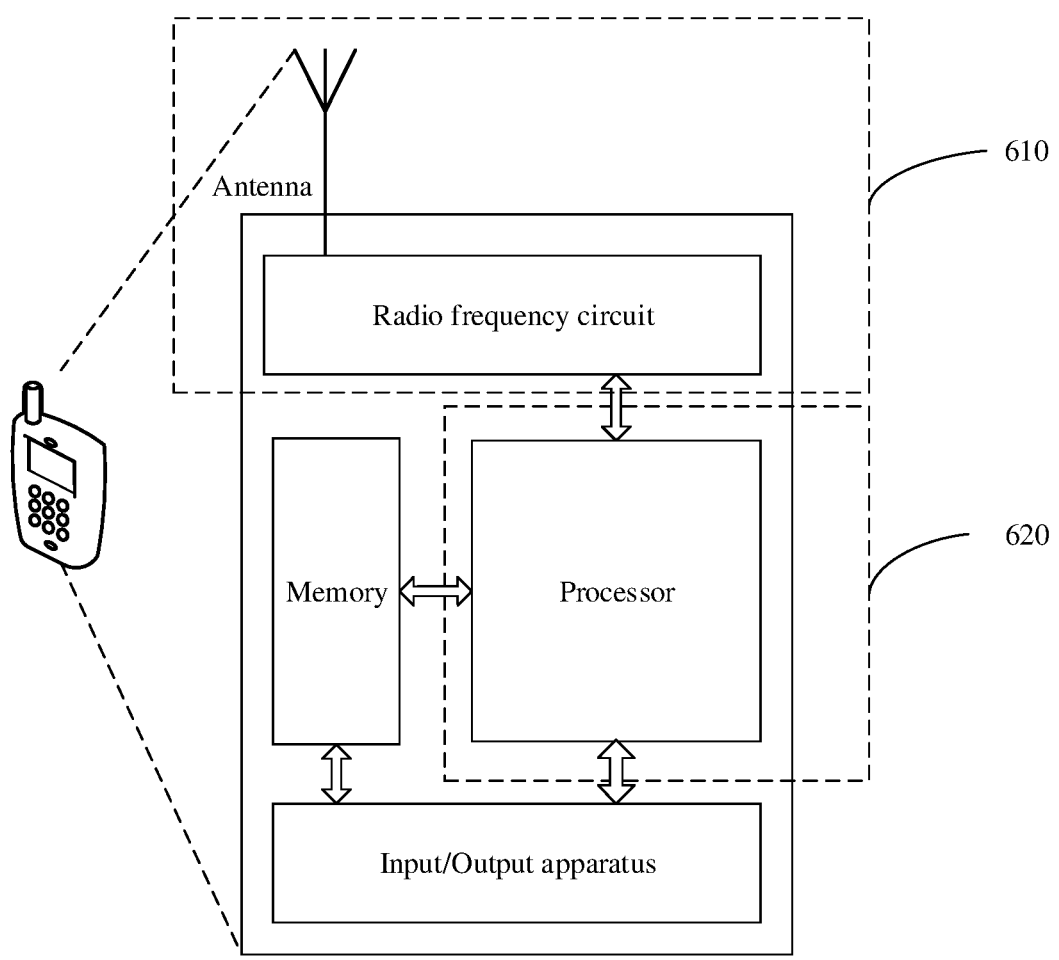
FIG. 6 is a schematic diagram of another structure of a communication apparatus according to an embodiment of this application.

FIG. 6 is a schematic diagram of another structure of a communication apparatus according to an embodiment of this application. The communication apparatus may be the second terminal device described in the foregoing embodiments, and the communication apparatus may be configured to perform functions of the second terminal device in the foregoing embodiments. For ease of description, FIG. 6 shows only main components of the communication apparatus. It can be learned from FIG. 6 that the communication apparatus includes a processor, a memory, a radio frequency circuit, an antenna, and an input/output apparatus. The communication apparatus shown in FIG. 6 and the communication apparatus shown in FIG. 5 are similar in term of structure. For specific content, refer to the foregoing descriptions of the communication apparatus shown in FIG. 5. Details are not described herein again.

In this embodiment of this application, the antenna and the radio frequency circuit that have receiving and sending functions may be considered as a transceiver unit of the communication apparatus, and the processor that has a processing function may be considered as a processing unit of the communication apparatus. As shown in FIG. 6, the communication apparatus includes a transceiver unit 610 and a processing unit 620. Herein, the transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 610 and that is configured to implement a receiving function may be considered as a receiving unit, and a component that is in the transceiver unit 610 and that is configured to implement a sending function may be considered as a sending unit, that is, the transceiver unit 610 includes a receiving unit and a sending unit. Herein, the receiving unit may also be sometimes referred to as a receiving machine, a receiver, a receiving circuit, or the like. The sending unit may also be sometimes referred to as a transmitter machine, a transmitter, a transmitting circuit, or the like.

It should be understood that the transceiver unit 610 is configured to perform operations such as receiving the scheduling information and receiving the sidelink data packet by the second terminal device in the foregoing embodiments, and the processing unit 620 is configured to perform operations such as determining the size of the sidelink data packet and determining the second time-frequency resource in the foregoing embodiments.

It can be learned with reference to the functions of the second terminal device in the foregoing embodiments that operations performed by the processing unit 620 and the transceiver unit 610 are similar to operations performed by the transceiver unit 510 and the processing unit 520 of the first terminal device, and details are not described herein again.

It should be noted that the communication apparatus may be a second terminal device, or may be a chip used in the second terminal device, or another combined device, another component, or the like that can implement a function of the second terminal device. When the communication apparatus is the second terminal device, the transceiver may be a transmitter and a receiver, or an integrated transceiver, and may include an antenna, a radio frequency circuit, and the like. The processing unit may be a processor, for example, a baseband chip. When the communication apparatus is a component having functions of the second terminal device, the transceiver 610 may be a radio frequency unit, and the processing module may be a processor. When the communication apparatus is a chip system, the transceiver unit may be an input/output interface of the chip system, and the processing unit may be a processor of the chip system, for example, a central processing unit (CPU).

Figure 7:
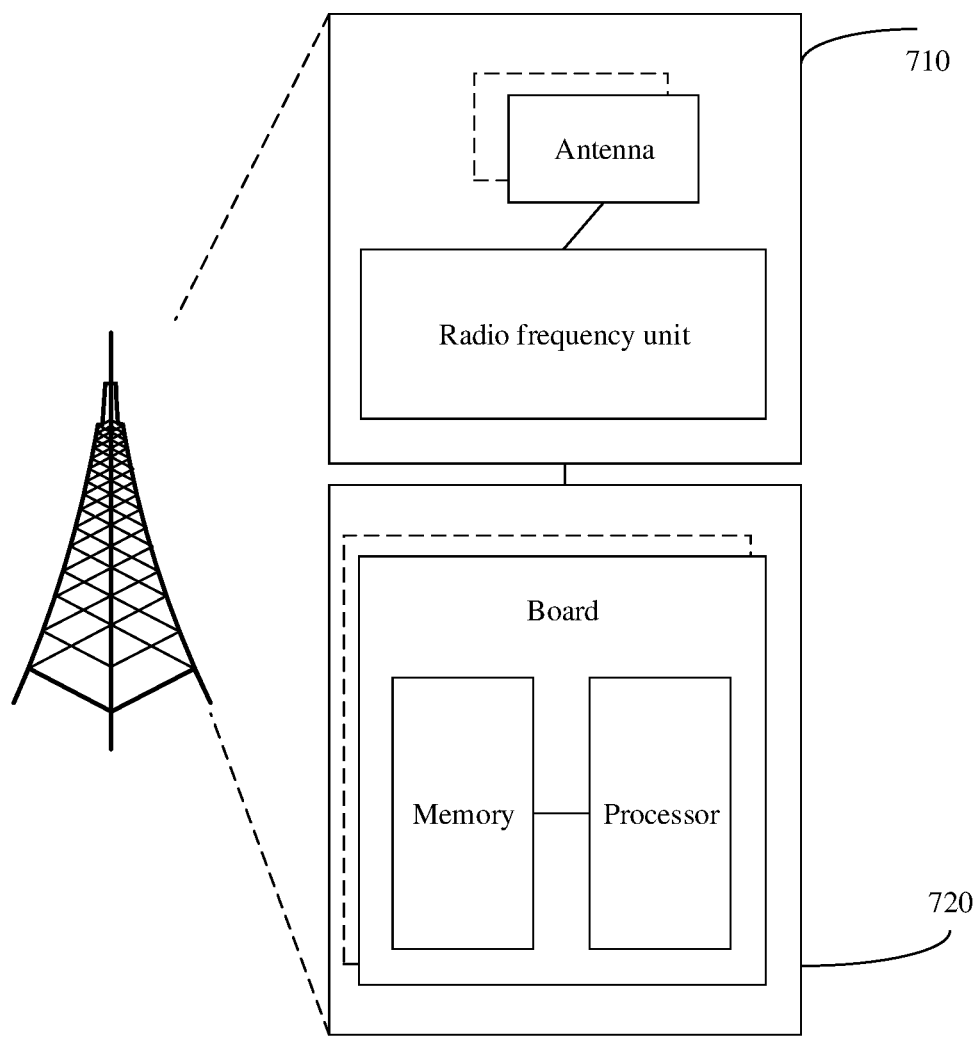
FIG. 7 is a schematic diagram of another structure of a communication apparatus according to an embodiment of this application.

FIG. 7 is a schematic diagram of another structure of a communication apparatus according to an embodiment of this application. As shown in FIG. 7, the communication apparatus may be used in the communication system shown in FIG. 1, to perform functions of the network device in the foregoing embodiments. The apparatus may include one or more transceiver units 710 and one or more processing units 720. The transceiver unit 710 may be referred to as a transceiver machine, a transceiver circuit, a transceiver, or the like, and may include at least one antenna and a radio frequency unit. The transceiver unit 710 is mainly configured to receive and send a radio frequency signal and perform conversion between a radio frequency signal and a baseband signal, for example, configured to send the indication information in the foregoing embodiments to a terminal device. The processing unit 720 is mainly configured to perform baseband processing, control the apparatus, and the like. The transceiver unit 710 and the processing unit 720 may be physically disposed together, or may be physically disposed separately. To be specific, the apparatus is a distributed apparatus. For example, the processing unit 720 may be configured to control the apparatus to perform the process of determining the indication information in the foregoing embodiments. In specific implementation, the processing unit 720 may include one or more boards. A plurality of boards may jointly support a radio access network (for example, an NR network) of a single access standard, or may respectively support radio access networks of different access standards. The processing unit 720 further includes a memory and a processor. The memory is configured to store necessary instructions and data. The processor is configured to control the apparatus to perform a necessary action, for example, configured to control the apparatus to perform an operation procedure that is related to the apparatus and that is in the foregoing method embodiments. The memory and the processor may serve one or more boards. In other words, the memory and the processor may be separately disposed on each board. Alternatively, the plurality of boards may share a same memory and processor. In addition, a necessary circuit may be further disposed on each board.

In an optional implementation, the processor may include a baseband processor and/or a central processing unit. The baseband processor is mainly configured to process a communication protocol and communication data. The central processing unit is mainly configured to control the entire apparatus, execute a software program, and process data of the software program. The processor in FIG. 7 may integrate functions of the baseband processor and the central processing unit. A person skilled in the art may understand that, alternatively, the baseband processor and the central processing unit may be independent processors, and interconnected by using a technology such as a bus. A person skilled in the art may understand that the apparatus may include a plurality of baseband processors to adapt to different network standards, the apparatus may include a plurality of central processing units to improve a processing capability of the apparatus, and components of the apparatus may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in a storage unit in a form of a software program. The processor executes the software program to implement a baseband processing function.

In an implementation, the processing unit 720 is configured to determine scheduling information. The transceiver unit 710 is configured to send the scheduling information to a first terminal device or a second terminal device.

In an implementation, the scheduling information includes data volume information of a sidelink data packet, a first time-frequency resource, a resource selection rule, and a time domain resource or a frequency domain resource of a second time-frequency resource. The data volume information is used by the first terminal device and the second terminal device to determine a size of the sidelink data packet.

In an implementation, the size of the sidelink data packet, the first time-frequency resource, the resource selection rule, and the time domain resource or the frequency domain resource of the second time-frequency resource are used by the first terminal device to determine the second time-frequency resource for sending the sidelink data packet to the second terminal device or receiving the sidelink data packet from the second terminal device.

In an implementation, the scheduling information is carried in physical layer signaling or radio resource control RRC signaling.

It should be noted that the communication apparatus may be a network device, or may be a chip used in the network device, or another combined device, another component, or the like that can implement a function of the network device. When the communication apparatus is the network device, the transceiver 710 may be a transmitter and a receiver, or an integrated transceiver, and may include an antenna, a radio frequency circuit, and the like. The processing unit may be a processor, for example, a baseband chip. When the communication apparatus is a component having functions of the network device, the transceiver 710 may be a radio frequency unit, and the processing module may be a processor. When the communication apparatus is a chip system, the transceiver unit may be an input/output interface of the chip system, and the processing unit may be a processor of the chip system, for example, a central processing unit (CPU).

The communication apparatus shown in FIG. 5 may alternatively be the first terminal device in some embodiments described in FIG. 4. The communication apparatus may be configured to perform the methods or steps implemented by the first terminal device in some embodiments described in FIG. 4. In this embodiment of this application, the antenna and the radio frequency circuit that have receiving and sending functions may be considered as a transceiver unit of the communication apparatus, and the processor that has a processing function may be considered as a processing unit of the communication apparatus. As shown in FIG. 5, the communication apparatus includes a transceiver unit 510 and a processing unit 520. Herein, the transceiver unit may also be referred to as a transceiver machine, a transceiver, a transceiver apparatus, or the like. The processing unit may also be referred to as a processor, a processing board, a processing module, a processing apparatus, or the like. Optionally, a component that is in the transceiver unit 510 and that is configured to implement a receiving function may be considered as a receiving unit, and a component that is in the transceiver unit 510 and that is configured to implement a sending function may be considered as a sending unit, that is, the transceiver unit 510 includes a receiving unit and a sending unit. Herein, the receiving unit may also be sometimes referred to as a receiving machine, a receiver, a receiving circuit, or the like. The sending unit may also be sometimes referred to as a transmitter machine, a transmitter, a transmitting circuit, or the like.

It should be understood that the processing unit 520 is configured to determine a size of a sidelink data packet, and determine second coding and modulation information based on the size of the sidelink data packet and a third time domain resource. The transceiver unit 510 is configured to send the sidelink data packet on the third time-frequency resource based on the second coding and modulation information.

For example, in an implementation, the processing unit 520 is configured to determine first spectral efficiency based on the size of the sidelink data packet and the preset third time-frequency resource. The processing unit 520 is further configured to determine a second coding and modulation scheme from a preset modulation and coding information set based on the first spectral efficiency and a modulation and coding scheme matching rule.

For example, in an implementation, the modulation and coding information set includes N3 types of coding and modulation information including the second coding and modulation information. The modulation and coding information matching rule includes spectral efficiency corresponding to the second coding and modulation information is less than the first spectral efficiency, and a difference between the spectral efficiency and the first spectral efficiency is the smallest, or spectral efficiency corresponding to the second coding and modulation information is greater than or equal to the first spectral efficiency, and a difference between the spectral efficiency and the first spectral efficiency is the smallest.

For example, in an implementation, the processing unit 520 is configured to determine a quantity of time-frequency units included in the preset third time-frequency resource, and determine the first spectral efficiency based on the quantity of time-frequency units and the size of the sidelink data packet.

Figure 8:
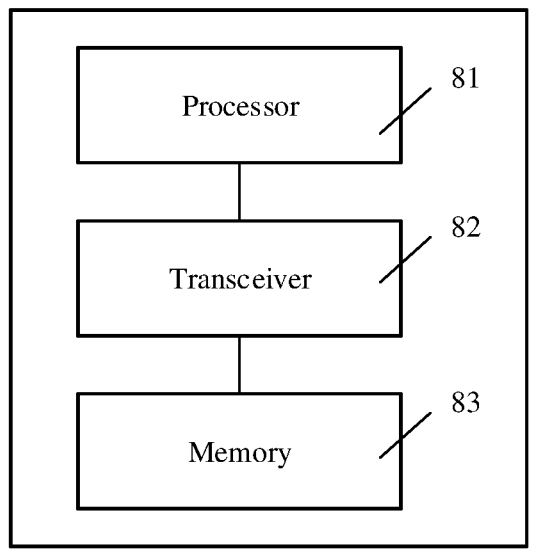
FIG. 8 is a schematic diagram of another structure of a communication apparatus according to an embodiment of this application.

FIG. 8 is a schematic diagram of another structure of a communication apparatus according to an embodiment of this application. The communication apparatus may be the first terminal device in some embodiments described in FIG. 2 or in some embodiments described in FIG. 4. The communication apparatus may be configured to implement the sidelink data packet sending and receiving method implemented by the first terminal device in some embodiments described in FIG. 2 or in some embodiments described in FIG. 4. The communication apparatus includes a processor 81, a memory 82, and a transceiver 83.

The memory 81 includes but is not limited to a random access memory (RAM), a read only memory (ROM), an electrically programmable ROM (EPROM), or a compact disc ROM (CD-ROM). The memory 81 is configured to store related instructions and data. The memory 81 stores the following elements, including an executable module or a data structure, a subset thereof, or an extended set thereof or an operation instruction, including various operation instructions, used to implement various operations, and an operating system, including various system programs, used to implement various basic services and process a hardware-based task.

Only one memory is shown in FIG. 8. Certainly, a plurality of memories may be disposed as required.

The transceiver 83 may be a communication module or a transceiver circuit. In this embodiment of this application, the transceiver 83 is configured to perform an operation, for example, sending a sidelink data packet or scheduling information in the foregoing embodiments.

The processor 81 may be a controller, a CPU, a general-purpose processor, a digital signal processor (DSP), an application specific integrated circuit (ASIC), a field programmable gate array (FPGA), or another programmable logic device, a transistor logic device, a hardware component, or any combination thereof. The processor 81 can implement or execute various example logical blocks, modules, and circuits described with reference to content disclosed in embodiments of this application. Alternatively, the processor 81 may be a combination of processors implementing a computing function, for example, a combination of one or more microprocessors, or a combination of the DSP and a microprocessor.

In a specific application, components of the communication apparatus may be coupled together by using a bus system. In addition to a data bus, the bus system may further include a power supply bus, a control bus, a status signal bus, and the like.

It should be noted that, in actual application, the processor in this embodiment of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in embodiments of this application. The general-purpose processor may be a microprocessor, or the processor may be any conventional processor, or the like. Steps of the methods disclosed with reference to embodiments of this application may be directly performed and completed by using a hardware decoding processor, or may be performed and completed by using a combination of hardware and a software module in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that, in embodiments of this application, the memory may be a volatile memory or a nonvolatile memory, or may include both a volatile memory and a nonvolatile memory. The nonvolatile memory may be the read-only memory (ROM), the programmable read-only memory (programmable ROM, PROM), an erasable programmable read-only memory (erasable PROM, EPROM), the electrically erasable programmable read-only memory (electrically EPROM, EEPROM), or the flash memory. The volatile memory may be the random access memory (RAM), used as an external cache. Through example but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory described in embodiments of this application aims to include but is not limited to these memories and any memory of another proper type.

An embodiment of this application further provides a computer-readable medium. The computer-readable medium stores a computer program, and when the computer program is executed by a computer, the method or steps performed by the first terminal device in the foregoing embodiments is/are implemented.

An embodiment of this application further provides a computer program product. When the computer program product is executed by a computer, the method or steps performed by the first terminal device in the foregoing embodiments is/are implemented.

An embodiment of this application further provides a communication apparatus. The communication apparatus may be the first terminal device in the foregoing embodiments. The communication apparatus includes a processor and an interface. The processor is configured to perform the method or steps performed by the terminal device in the foregoing embodiments. It should be understood that the terminal device may be a chip, and the processor may be implemented by hardware or software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

Figure 9:
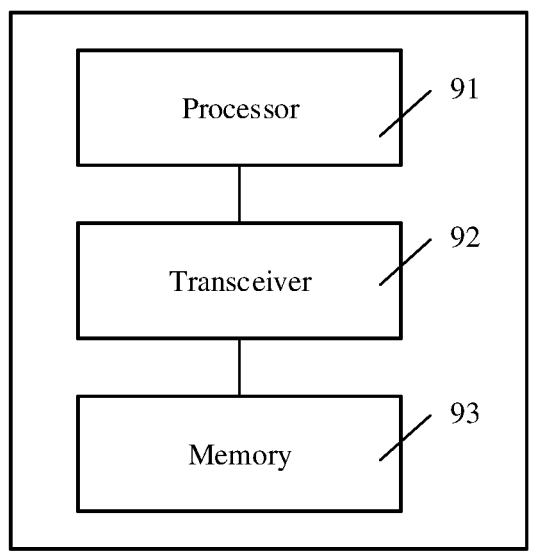
FIG. 9 is a schematic diagram of another structure of a communication apparatus according to an embodiment of this application.

FIG. 9 is a schematic diagram of another structure of a communication apparatus according to an embodiment of this application. The communication apparatus may be the second terminal device in the foregoing embodiments, and the communication apparatus may be configured to implement the method implemented by the second terminal device in the foregoing embodiments. The communication apparatus includes a processor 91, a memory 92, and a transceiver 93.

The memory 91 includes but is not limited to a RAM, a ROM, an EPROM, or a CD-ROM. The memory 91 is configured to store related instructions and data. The memory 91 stores the following elements, including an executable module or a data structure, a subset thereof, or an extended set thereof, including an operation instruction including various operation instructions, used to implement various operations, and an operating system, including various system programs, used to implement various basic services and process a hardware-based task.

Only one memory is shown in FIG. 9. Certainly, a plurality of memories may be disposed as required.

The transceiver 93 may be a communication module or a transceiver circuit. In this embodiment of this application, the transceiver 93 is configured to perform an operation, for example, receiving a sidelink data packet.

The processor 91 may be a controller, a CPU, a general-purpose processor, a DSP, an ASIC, an FPGA, or another programmable logic device, a transistor logic device, a hardware component, or any combination thereof. The processor 91 can implement or execute various example logical blocks, modules, and circuits described with reference to content disclosed in embodiments of this application. Alternatively, the processor 91 may be a combination of processors implementing a computing function, for example, a combination of one or more microprocessors, or a combination of the DSP and a microprocessor.

In a specific application, components of the communication apparatus may be coupled together by using a bus system. In addition to a data bus, the bus system may further include a power supply bus, a control bus, a status signal bus, and the like.

An embodiment of this application further provides a computer-readable medium. The computer-readable medium stores a computer program, and when the computer program is executed by a computer, the method or steps performed by the second terminal device in the foregoing embodiments is/are implemented.

An embodiment of this application further provides a computer program product. When the computer program product is executed by a computer, the method or steps performed by the second terminal device in the foregoing embodiments is/are implemented.

An embodiment of this application further provides a communication apparatus. The communication apparatus may be the second terminal device in embodiments. The communication apparatus includes a processor and an interface. The processor is configured to perform the method or steps performed by the terminal device in the foregoing embodiments. It should be understood that the terminal device may be a chip, and the processor may be implemented by hardware or software. When the processor is implemented by hardware, the processor may be a logic circuit, an integrated circuit, or the like. When the processor is implemented by software, the processor may be a general-purpose processor, and is implemented by reading software code stored in a memory. The memory may be integrated into the processor, or may be located outside the processor and may exist independently.

Figure 10:
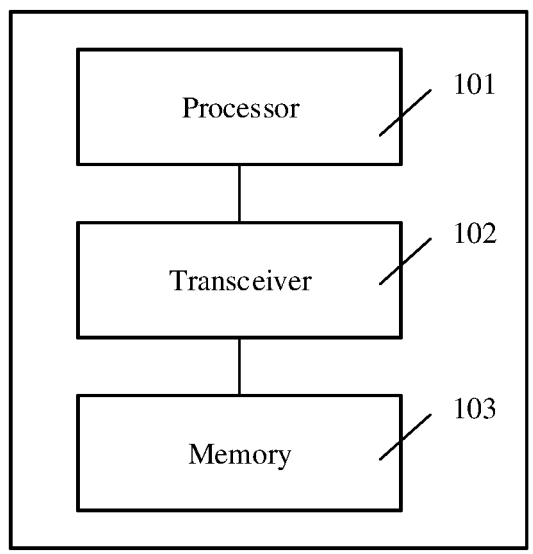
FIG. 10 is a schematic diagram of another structure of a communication apparatus according to an embodiment of this application.

FIG. 10 is a schematic diagram of another structure of a communication apparatus according to an embodiment of this application. The communication apparatus may be the network device in some embodiments described in FIG. 2 or FIG. 4, and may be configured to implement the method or steps implemented by the network device in the foregoing embodiments. The apparatus includes a processor 101, a memory 102, and a transceiver 103.

The memory 102 includes but is not limited to a RAM, a ROM, an EPROM, or a CD-ROM. The memory 102 is configured to store related instructions and data. The memory 102 stores the following elements, including an executable module or a data structure, a subset thereof, or an extended set thereof, including an operation instruction, including various operation instructions, used to implement various operations, and an operating system, including various system programs, used to implement various basic services and process a hardware-based task.

Only one memory is shown in FIG. 10. Certainly, a plurality of memories may be disposed as required.

The transceiver 103 may be a communication module or a transceiver circuit. In this embodiment of this application, the transceiver 103 is configured to perform the process of sending the indication information in embodiments.

The processor 101 may be a controller, a CPU, a general-purpose processor, a DSP, an ASIC, an FPGA, or another programmable logic device, a transistor logic device, a hardware component, or any combination thereof. The processor 101 can implement or execute various example logical blocks, modules, and circuits described with reference to content disclosed in embodiments of this application. Alternatively, the processor 101 may be a combination of processors implementing a computing function, for example, a combination of one or more microprocessors, or a combination of the DSP and a microprocessor.

In a specific application, components of the apparatus may be coupled together by using a bus system. In addition to a data bus, the bus system may further include a power supply bus, a control bus, a status signal bus, and the like.

It should be noted that, in actual application, the processor in this embodiment of this application may be an integrated circuit chip, and has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in embodiments of this application.

It should be noted that this application further provides a communication system, including the foregoing one or more first terminal devices, one or more second terminal devices, and one or more network devices.

All or a part of the foregoing method embodiments may be implemented by software, hardware, firmware, or any combination thereof. When software is used to implement embodiments, all or some of embodiments may be implemented in a form of a computer program product. The computer program product includes one or more computer instructions. When the computer instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

It should be understood that the terms "system" and "network" may be used interchangeably in embodiments of this application. The term "and/or" in embodiments describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the examples described in embodiments disclosed in this specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

In embodiments provided in this application, it should be understood that the disclosed system, apparatus, and method may be implemented in other manners. For example, the described apparatuses are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

In conclusion, the foregoing descriptions are merely example embodiments of the technical solutions of this application, but are not intended to limit the protection scope of this application. Any modification, equivalent replacement, or improvement made without departing from the spirit and the principle of this application shall fall within the protection scope of this application.

What is claimed is:

1. A method, comprising:
   determining, by a first terminal device, a size of a sidelink data packet;
   determining, by the first terminal device based on the size of the sidelink data packet, a first quantity of time-frequency units corresponding to the sidelink data packet;
   determining, by the first terminal device, a frequency domain resource of a second time-frequency resource from a first time-frequency resource, based on the first quantity, a resource selection rule, and at least one of a time domain resource of the second time-frequency resource, or a frequency domain resource of the second time-frequency resource; and
   performing, by the first terminal device, at least one of sending the sidelink data packet to a second terminal device on the second time-frequency resource, or receiving the sidelink data packet from a second terminal device on the second time-frequency resource, wherein the sidelink data packet is sent based on a time-frequency resource predefined in a communication protocol of the first terminal device and the second terminal device without receiving sidelink control signaling;
   wherein the determining, by the first terminal device, the frequency domain resource of the second time-frequency resource from the first time-frequency resource based on the first quantity, the time domain resource of the second time-frequency resource, and the resource selection rule comprises:
      determining, by the first terminal device, a second quantity of first time domain units comprised in the time domain resource of the second time-frequency resource; and
      determining, by the first terminal device based on the second quantity and the first quantity, a third quantity of first frequency domain units comprised in the frequency domain resource of the second time-frequency resource; and
   wherein the first time domain unit comprises N1 second time domain units, the first frequency domain unit comprises N2 second frequency domain units, and the third quantity, the second quantity, and the first quantity meet the following relational expression:

$$R2 = \frac{T1}{R1 \times N1 \times N2},$$

and
   wherein R2 is the third quantity of first frequency domain units comprised in the frequency domain resource of the second time-frequency resource, R1 is the second quantity, T1, R1, N1, R2, and N2 are positive integers greater than 0, a preset condition is met between T1 and the first quantity, and T1 is a quantity of time-frequency units comprised in the second time-frequency resource.

2. The method according to claim 1, wherein the resource selection rule is predefined, and wherein the resource selection rule comprises at least one of:
   selecting at least one second time domain unit from second time domain units based on a sequence number of each second time domain unit comprised in the first time-frequency resource, wherein the sequence numbers of the second time domain units indicate a sequence of the second time domain units in time domain; or selecting at least one first frequency domain unit based on a sequence number of each first frequency domain unit comprised in the first time-frequency resource, wherein the sequence numbers of the first frequency domain units indicate a sequence of the first frequency domain units in frequency domain.

3. The method according to claim 1, wherein the determining, by the first terminal device, the frequency domain resource of the second time-frequency resource from the first time-frequency resource based on the first quantity, the time domain resource of the second time-frequency resource, and the resource selection rule further comprises:

determining, by the first terminal device, the frequency domain resource of the second time-frequency resource from the first time-frequency resource based on the third quantity and a resource allocation rule.

4. The method according to claim 3, wherein the preset condition comprises:

T1 is a largest positive integer among all positive integers less than or equal to the first quantity; or T1 is a smallest positive integer among all positive integers greater than the first quantity.

5. The method according to claim 1, wherein the determining, by the first terminal device, the time domain resource of the second time-frequency resource from the first time-frequency resource based on the first quantity, the frequency domain resource of the second time-frequency resource, and the resource selection rule comprises:

determining, by the first terminal device, a fourth quantity of first frequency domain units comprised in the frequency domain resource of the second time-frequency resource;

determining, by the first terminal device based on the fourth quantity and the first quantity, a fifth quantity of second time domain units comprised in a second time domain resource of the second time-frequency resource; and determining, by the first terminal device, the time domain resource of the second time-frequency resource from the first time-frequency resource based on the fifth quantity and a resource allocation rule.

6. The method according to claim 5, wherein the second time domain units comprise a plurality of second time domain units, the first frequency domain unit comprises N2 second frequency domain units, and the fourth quantity, the fifth quantity, and the first quantity meet the following relational expression:

$$R4 = \frac{T2}{R3 \times N2},$$

wherein R4 is the fifth quantity of second time domain units comprised in the time domain resource of the second time-frequency resource, R3 is the fourth quantity, T2, R3, R4, and N2 are positive integers greater than 0, a preset condition is met between T2 and the first quantity, and T2 is a quantity of time-frequency units comprised in the second time-frequency resource.

7. The method according to claim 6, wherein the preset condition comprises:

T2 is a largest positive integer among all positive integers less than or equal to the first quantity; or T2 is a smallest positive integer among all positive integers greater than the first quantity.

8. A communication apparatus, comprising:
at least one processor; and
a non-transitory computer-readable medium storing a program to be executed by the processor, the program including instructions for:
determining a size of a sidelink data packet;
determining, based on the size of the sidelink data packet, a first quantity of time-frequency units corresponding to the sidelink data packet;
performing at least one of:
determining a frequency domain resource of a second time-frequency resource from a first time-frequency resource based on the first quantity, a time domain resource of the second time-frequency resource, and a resource selection rule; or
determining a time domain resource of a second time-frequency resource from a first time-frequency resource based on the first quantity, a frequency domain resource of the second time-frequency resource, and a resource selection rule; and
performing at least one of:
sending the sidelink data packet to a second terminal device on the second time-frequency resource; or
receiving the sidelink data packet from a second terminal device on the second time-frequency resource;
wherein the sidelink data packet is sent or received based on a time-frequency resource predefined in a communication protocol of the communication apparatus and the second terminal device without receiving sidelink control signaling;
wherein the determining the frequency domain resource of the second time-frequency resource from the first time-frequency resource based on the first quantity, the time domain resource of the second time-frequency resource, and the resource selection rule comprises:
determining a second quantity of first time domain units comprised in the time domain resource of the second time-frequency resource;
determining, based on the second quantity and the first quantity, a third quantity of first frequency domain units comprised in the frequency domain resource of the second time-frequency resource;
wherein the first time domain unit comprises N1 second time domain units, the first frequency domain unit comprises N2 second frequency domain units, and the third quantity, the second quantity, and the first quantity meet the following relational expression:

$$R2 = \frac{T1}{R1 \times N1 \times N2},$$

and
wherein R2 is the third quantity of first frequency domain units comprised in the frequency domain resource of the second time-frequency resource, R1 is the second quantity, T1, R1, N1, R2, and N2 are positive integers greater than 0, a preset condition is met between T1 and the first quantity, and T1 is a quantity of time-frequency units comprised in the second time-frequency resource.

9. The communication apparatus according to claim 8, wherein the resource selection rule is predefined, and the resource selection rule comprises at least one of:
selecting at least one second time domain unit from second time domain units based on a sequence number of each second time domain unit comprised in the first time-frequency resource, wherein the sequence numbers of the second time domain units indicate a sequence of the second time domain units in time domain; or
selecting at least one first frequency domain unit based on a sequence number of each first frequency domain unit comprised in the first time-frequency resource, wherein the sequence numbers of the first frequency domain units indicate a sequence of the first frequency domain units in frequency domain.

10. The communication apparatus according to claim 8, wherein the determining the frequency domain resource of the second time-frequency resource from the first time-frequency resource based on the first quantity, the time domain resource of the second time-frequency resource, and the resource selection rule further comprises:
determining the frequency domain resource of the second time-frequency resource from the first time-frequency resource based on the third quantity and a resource allocation rule.

11. The communication apparatus according to claim 10, wherein the preset condition comprises:
T1 is a largest positive integer among all positive integers less than or equal to the first quantity; or
T1 is a smallest positive integer among all positive integers greater than the first quantity.

12. The communication apparatus according to claim 8, wherein the determining the time domain resource of the second time-frequency resource from the first time-frequency resource based on the first quantity, the frequency domain resource of the second time-frequency resource, and the resource selection rule comprises:
determining a fourth quantity of first frequency domain units comprised in the frequency domain resource of the second time-frequency resource;
determining, based on the fourth quantity and the first quantity, a fifth quantity of second time domain units comprised in a second time domain resource of the second time-frequency resource; and
determining the time domain resource of the second time-frequency resource from the first time-frequency resource based on the fifth quantity and a resource allocation rule.

13. The communication apparatus according to claim 12, wherein the second time domain units comprise a plurality of second time domain units, the first frequency domain unit comprises N2 second frequency domain units, and the fourth quantity, the fifth quantity, and the first quantity meet the following relational expression:

$$R4 = \frac{T2}{R3 \times N2},$$

wherein R4 is the fifth quantity of second time domain units comprised in the time domain resource of the second time-frequency resource, R3 is the fourth quantity, T2, R3, R4, and N2 are positive integers greater than 0, a preset condition is met between T2 and the first quantity, and T2 is a quantity of time-frequency units comprised in the second time-frequency resource.

14. The communication apparatus according to claim 13, wherein the preset condition comprises:
T2 is a largest positive integer among all positive integers less than or equal to the first quantity; or
T2 is a smallest positive integer among all positive integers greater than the first quantity.

15. A communication apparatus, comprising:
at least one processor; and
a non-transitory computer-readable medium storing a program to be executed by the processor, the program including instructions for:
determining scheduling information, wherein the scheduling information indicates a first time-frequency resource and data volume information of a sidelink data packet, wherein a first terminal device and a second terminal device determine a first quantity of time-frequency units corresponding to the sidelink data packet and a size of the sidelink data packet based on the data volume information, and wherein the first time-frequency resource is a time-frequency resource range corresponding to a sidelink communication service between the first terminal device and the second terminal device; and
sending the scheduling information to at least one of the first terminal device or the second terminal device, wherein the first terminal device determines a second time-frequency resource for sending the sidelink data packet to the second terminal device or receiving the sidelink data packet from the second terminal device based on the size of the sidelink data packet and the first time-frequency resource based on a time-frequency resource predefined in a communication protocol of the first terminal device and the second terminal device without sending sidelink control signaling to or receiving sidelink control signaling;
wherein the scheduling information further comprises a resource selection rule and a time domain resource or a frequency domain resource of the second time-frequency resource, and wherein the first terminal device determines the second time-frequency resource for sending the sidelink data packet to the second terminal device, or for receiving the sidelink data packet from the second terminal device, based on the resource selection rule and the time domain resource or the frequency domain resource of the second time-frequency resource;
wherein determining a frequency domain resource of the second time-frequency resource from the first time-frequency resource based on the first quantity, the time domain resource of the second time-frequency resource, and the resource selection rule comprises:
determining a second quantity of first time domain units comprised in the time domain resource of the second time-frequency resource;
determining, based on the second quantity and the first quantity, a third quantity of first frequency domain units comprised in the frequency domain resource of the second time-frequency resource;
wherein the first time domain unit comprises N1 second time domain units, the first frequency domain unit comprises N2 second frequency domain units, and the third quantity, the second quantity, and the first quantity meet the following relational expression:

$$R2 = \frac{T1}{R1 \times N1 \times N2},$$

and wherein R2 is the third quantity of first frequency domain units comprised in the frequency domain resource of the second time-frequency resource, R1 is the second quantity, T1, R1, N1, R2, and N2 are positive integers greater than 0, a preset condition is met between T1 and the first quantity, and T1 is a quantity of time-frequency units comprised in the second time-frequency resource.

16. The communication apparatus according to claim 15, wherein the determining, by the first terminal device, the frequency domain resource of the second time-frequency resource from the first time-frequency resource based on the first quantity, the time domain resource of the second time-frequency resource, and the resource selection rule further comprises:
   determining, by the first terminal device, the frequency domain resource of the second time-frequency resource from the first time-frequency resource based on the third quantity and a resource allocation rule.

17. The communication apparatus according to claim 16, wherein the preset condition comprises:
   T1 is a largest positive integer among all positive integers less than or equal to the first quantity; or
   T1 is a smallest positive integer among all positive integers greater than the first quantity.

18. The communication apparatus according to claim 15, wherein the determining, by the first terminal device, the time domain resource of the second time-frequency resource from the first time-frequency resource based on the first quantity, the frequency domain resource of the second time-frequency resource, and the resource selection rule comprises:
   determining, by the first terminal device, a fourth quantity of first frequency domain units comprised in the frequency domain resource of the second time-frequency resource;
   determining, by the first terminal device based on the fourth quantity and the first quantity, a fifth quantity of second time domain units comprised in a second time domain resource of the second time-frequency resource; and
   determining, by the first terminal device, the time domain resource of the second time-frequency resource from the first time-frequency resource based on the fifth quantity and a resource allocation rule.

19. The communication apparatus according to claim 18, wherein the second time domain unit comprises a plurality of second time domain units, the first frequency domain unit comprises N2 second frequency domain units, and the fourth quantity, the fifth quantity, and the first quantity meet the following relational expression:

$$R4 = \frac{T2}{R3 \times N2},$$

wherein R4 is the fifth quantity of second time domain units comprised in the time domain resource of the second time-frequency resource, R3 is the fourth quantity, T2, R3, R4, and N2 are positive integers greater than 0, a preset condition is met between T2 and the first quantity, and T2 is a quantity of time-frequency units comprised in the second time-frequency resource.

* * * * *